United States Patent
Chen et al.

(10) Patent No.: US 12,513,099 B2
(45) Date of Patent: Dec. 30, 2025

(54) CAPTURING OUTPUT OF LANGUAGE OPERATOR-BASED COMMUNICATION ANALYSIS

(71) Applicant: Twilio Inc., San Francisco, CA (US)

(72) Inventors: Yongjie Chen, London (GB); Qi Feng, London (GB)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/400,529

(22) Filed: Dec. 29, 2023

(65) Prior Publication Data
US 2025/0071077 A1    Feb. 27, 2025

Related U.S. Application Data

(60) Provisional application No. 63/534,034, filed on Aug. 22, 2023.

(51) Int. Cl.
G06F 40/40    (2020.01)
H04L 51/21    (2022.01)
H04L 67/306    (2022.01)

(52) U.S. Cl.
CPC .............. *H04L 51/21* (2022.05); *G06F 40/40* (2020.01); *H04L 67/306* (2013.01)

(58) Field of Classification Search
CPC ....... H04L 51/21; H04L 67/306; G06F 40/40; G06F 40/30; G06F 40/20
See application file for complete search history.

(56) References Cited

U.S. PATENT DOCUMENTS

| | | | |
|---|---|---|---|
| 3,568,155 | A | 3/1971 | Abraham et al. |
| 5,384,703 | A | 1/1995 | Withgott et al. |
| 5,945,933 | A | 8/1999 | Kalkstein |
| 6,138,139 | A | 10/2000 | Beck et al. |
| 6,567,805 | B1 | 5/2003 | Johnson et al. |
| 7,702,508 | B2 | 4/2010 | Bennett |
| 7,725,321 | B2 | 5/2010 | Bennett |
| 7,801,910 | B2 | 9/2010 | Houh et al. |
| 8,428,227 | B2 | 4/2013 | Angel et al. |

(Continued)

FOREIGN PATENT DOCUMENTS

| | | |
|---|---|---|
| WO | 2021234610 | 11/2021 |
| WO | WO-2022086939 A1 | 4/2022 |

OTHER PUBLICATIONS

U.S. Appl. No. 17/305,976, filed Jul. 19, 2021, Transition-Driven Transcript Search (as amended).

(Continued)

*Primary Examiner* — Meng Vang
(74) *Attorney, Agent, or Firm* — Schwegman Lundberg & Woessner, P.A.

(57) ABSTRACT

A method and system for automatically analyzing and/or summarizing communications using language operators, the method receiving a definition of a language operator, the definition comprising one or more phrases indicative of a match to a concept associated with a communication; surfacing, in a UI, one or more results of applying the language operator to the communication, the surfacing of each result of the one or more results using an interactive UI element linked to one or more communication phrases, the interactive UI element highlighting a match between the concept and the one or more communication phrases; and training a machine learned (ML) model to improve an accuracy of the result based on one or more inputs received via the UI.

12 Claims, 27 Drawing Sheets

(56) References Cited

U.S. PATENT DOCUMENTS

| | | |
|---|---|---|
| 8,494,133 B2 | 7/2013 | Jeffs et al. |
| 8,775,165 B1 | 7/2014 | Oikawa |
| 8,798,242 B1 | 8/2014 | Sankaranarayanan |
| 8,942,359 B2 | 1/2015 | Seetharaman et al. |
| 8,983,975 B2 | 3/2015 | Kenton et al. |
| 9,880,807 B1 | 1/2018 | Haggerty et al. |
| 9,910,909 B2 | 3/2018 | Hegde et al. |
| 9,965,726 B1 | 5/2018 | Tablan et al. |
| 10,089,639 B2 | 10/2018 | Kannan et al. |
| 10,453,455 B2 | 10/2019 | Manuvinakurike et al. |
| 10,467,339 B1 | 11/2019 | Shen |
| 10,839,335 B2 | 11/2020 | Weisman et al. |
| 10,978,056 B1* | 4/2021 | Challa ................. G06N 5/025 |
| 11,165,900 B2 | 11/2021 | Sachdev |
| 11,170,175 B1 | 11/2021 | Kohli et al. |
| 11,475,210 B2 | 10/2022 | De Oliveira et al. |
| 11,568,231 B2 | 1/2023 | Meteer et al. |
| 11,765,267 B2 | 9/2023 | Cole et al. |
| 11,809,804 B2 | 11/2023 | Láinez Rodrigo et al. |
| 11,848,025 B2 | 12/2023 | Proenca et al. |
| 11,941,348 B2 | 3/2024 | De Oliveira et al. |
| 11,947,872 B1 | 4/2024 | Mahler-Haug et al. |
| 12,079,573 B2 | 9/2024 | Láinez rodrigo et al. |
| 12,158,902 B2 | 12/2024 | De Oliveira et al. |
| 12,166,919 B2 | 12/2024 | Cole et al. |
| 2002/0046018 A1 | 4/2002 | Marcu et al. |
| 2004/0093200 A1* | 5/2004 | Scott ................. G06F 40/284 704/9 |
| 2007/0133437 A1 | 6/2007 | Wengrovitz et al. |
| 2009/0030894 A1 | 1/2009 | Mamou et al. |
| 2010/0104086 A1 | 4/2010 | Park |
| 2010/0332477 A1 | 12/2010 | Jeffs et al. |
| 2013/0007037 A1 | 1/2013 | Azzam et al. |
| 2014/0108369 A1* | 4/2014 | Nijjer ................. G06F 16/23 707/706 |
| 2014/0169547 A1 | 6/2014 | Murgai |
| 2015/0032448 A1 | 1/2015 | Wasserblat et al. |
| 2015/0046783 A1 | 2/2015 | O'donoghue et al. |
| 2015/0106091 A1 | 4/2015 | Wetjen et al. |
| 2015/0181020 A1 | 6/2015 | Fitzsimmons et al. |
| 2015/0256677 A1 | 9/2015 | Konig et al. |
| 2016/0092792 A1 | 3/2016 | Chandrasekaran et al. |
| 2018/0113854 A1 | 4/2018 | Vig et al. |
| 2018/0332165 A1 | 11/2018 | Cunningham et al. |
| 2019/0121852 A1 | 4/2019 | Applegate et al. |
| 2019/0392837 A1 | 12/2019 | Jung et al. |
| 2020/0279017 A1 | 9/2020 | Norton et al. |
| 2021/0056170 A1 | 2/2021 | Bohannon et al. |
| 2021/0158805 A1 | 5/2021 | Sivasubramanian et al. |
| 2021/0264097 A1 | 8/2021 | Herzig et al. |
| 2021/0294829 A1 | 9/2021 | Bender et al. |
| 2021/0335367 A1 | 10/2021 | Graff et al. |
| 2021/0365485 A1 | 11/2021 | Kohita et al. |
| 2022/0067269 A1 | 3/2022 | De Oliveira et al. |
| 2022/0067284 A1 | 3/2022 | He et al. |
| 2022/0121884 A1 | 4/2022 | Zadeh et al. |
| 2022/0156296 A1 | 5/2022 | De Oliveira et al. |
| 2022/0156460 A1 | 5/2022 | Láinez Rodrigo et al. |
| 2022/0210268 A1 | 6/2022 | Cole et al. |
| 2022/0382959 A1 | 12/2022 | Láinez Rodrigo et al. |
| 2022/0414319 A1 | 12/2022 | De Oliveira et al. |
| 2023/0134796 A1* | 5/2023 | Bhatnagar ............. G06N 20/20 704/9 |
| 2023/0388413 A1 | 11/2023 | Cole et al. |
| 2024/0037418 A1 | 2/2024 | Durairaj et al. |
| 2024/0152689 A1 | 5/2024 | De Oliveira et al. |
| 2024/0378384 A1 | 11/2024 | Rodrigo et al. |
| 2025/0030797 A1 | 1/2025 | Cole et al. |

OTHER PUBLICATIONS

U.S. Appl. No. 17/447,039 U.S. Pat. No. 11,765,267, filed Sep. 7, 2021, Tool for Annotating and Reviewing Audio Conversations.
U.S. Appl. No. 18/448,675, filed Aug. 11, 2023, Tool for Annotating and Reviewing Audio Conversations.
U.S. Appl. No. 17/304,081 U.S. Pat. No. 11,475,210, filed Jun. 14, 2021, Language Model for Abstractive Summarization.
U.S. Appl. No. 17/939,176 U.S. Pat. No. 11,941,348, filed Sep. 7, 2022, Language Model for Abstractive Summarization.
U.S. Appl. No. 18/410,621, filed Jan. 11, 2024, Language Model for Abstractive Summarization.
U.S. Appl. No. 17/449,405, filed Sep. 29, 2021, Tool for Categorizing and Extracting Data From Audio Conversations.
"U.S. Appl. No. 17/303,279, Notice of Allowance mailed Aug. 24, 2023", 11 pgs.
"U.S. Appl. No. 17/304,081, Notice of Allowability mailed Jul. 20, 2022", 2 pgs.
"U.S. Appl. No. 17/304,081, Notice of Allowance mailed Jun. 9, 2022", 9 pgs.
"U.S. Appl. No. 17/305,976, Examiner Interview Summary mailed Dec. 12, 2023", 2 pgs.
"U.S. Appl. No. 17/305,976, Final Office Action mailed Jan. 9, 2024", 19 pgs.
"U.S. Appl. No. 17/305,976, Non Final Office Action mailed Mar. 26, 2024", 18 pgs.
"U.S. Appl. No. 17/305,976, Non Final Office Action mailed Sep. 21, 2023", 17 pgs.
"U.S. Appl. No. 17/305,976, Response filed Mar. 6, 2024 to Final Office Action mailed Jan. 9, 2024", 13 pgs.
"U.S. Appl. No. 17/305,976, Response filed Dec. 14, 2023 to Non Final Office Action mailed Sep. 21, 2023", 13 pgs.
"U.S. Appl. No. 17/447,039, Examiner Interview Summary mailed Nov. 7, 2022", 2 pgs.
"U.S. Appl. No. 17/447,039, Final Office Action mailed Feb. 21, 2023", 11 pgs.
"U.S. Appl. No. 17/447,039, Non Final Office Action mailed Aug. 16, 2022", 10 pgs.
"U.S. Appl. No. 17/447,039, Notice of Allowance mailed May 12, 2023", 11 pgs.
"U.S. Appl. No. 17/447,039, Response filed Apr. 21, 2023 to Final Office Action mailed Feb. 21, 2023", 11 pgs.
"U.S. Appl. No. 17/447,039, Response filed Nov. 16, 2022 to Non Final Office Action mailed Aug. 16, 2022", 11 pgs.
"U.S. Appl. No. 17/449,405, Examiner Interview Summary mailed Jan. 24, 2024", 2 pgs.
"U.S. Appl. No. 17/449,405, Non Final Office Action mailed Nov. 27, 2023", 12 pgs.
"U.S. Appl. No. 17/449,405, Response filed Feb. 27, 2024 to Non Final Office Action mailed Nov. 27, 2023", 12 pgs.
"Application Serial No. 17/939,176, Non Final Office Action mailed Jun. 15, 2023", 8 pgs.
"U.S. Appl. No. 17/939,176, Notice of Allowance mailed Nov. 8, 2023", 8 pgs.
"U.S. Appl. No. 17/939,176, Response filed Sep. 14, 2023 to Non Final Office Action mailed Jun. 15, 2023", 8 pgs.
"U.S. Appl. No. 17/939,176, Supplemental Notice of Allowability mailed Feb. 21, 2024", 3 pgs.
"U.S. Appl. No. 18/448,675, Non Final Office Action mailed Mar. 12, 2024", 8 pgs.
Ba, Jimmy Lei, et al., "Layer Normalization", (Jul. 21, 2016), 14 pgs.
Celikyilmaz, Asli, et al., "Deep Communicating Agents for Abstractive Summarization", arXiv preprint, arXiv:1803.10357v3 [cs.CL], (Aug. 15, 2018), 14 pgs.
Chopra, Sumit, et al., "Abstractive Sentence Summarization with Attentive Recurrent Neural Networks", Proceedings of the NAACL-HLT16, (2016), 93-98.
Dai, et al., "Semi-supervised Sequence Learning", arXiv preprint, arXiv:1511.01432 [cs.LG], (Nov. 4, 2015), 10 pgs.
Devlin, Jacob, et al., "BERT: Pre-training of Deep Bidirectional Transformers for Language Understanding", (2018), 14 pgs.
Efstathiou, et al., "Semantic Source Code Models Using Identifier Embeddings", IEEE/ACM 16th International Conference on Mining Software Repositories (MSR), (2019), 29-33.

(56) References Cited

OTHER PUBLICATIONS

Gehrmann, Sebastian, et al., "Bottom-Up Abstractive Summarization", arXiv preprint, arXiv:1808.10792v2 [cs.CL], (Oct. 9, 2018), 12 pgs.
Gu, Jiatao, et al., "Incorporating Copying Mechanism in Sequence-to-Sequence Learning", arXiv preprint, arXiv:1603.06393v3, (Jun. 8, 2016), 10 pgs.
Holtzman, Ari, et al., "The Curious Case of Neural Text Degeneration", 8th International Conference on Learning Representations (ICLR), (Apr. 2020), 16 pgs.
Howard, Jeremy, et al., "Universal Language Model Fine-tuning for Text Classification", arXiv preprint, arXiv:1801.06146v5 [cs.CL], (May 23, 2018), 12 pgs.
Kingma, Diederik P, et al., "Adam: A Method for Stochastic Optimization", (Jan. 30, 2017), 15 pgs.
Kudo, Taku, et al., "SentencePiece: A simple and language independent subword tokenizer and detokenizer for Neural Text Processing", arXiv preprint, arXiv:1808.06226v1 [cs.CL], (Aug. 19, 2018), 6 pgs.
Li, Piji, et al., "Actor-Critic based Training Framework for Abstractive Summarization", arXiv preprint, arXiv:1803.11070v2 [cs.CL], (Aug. 15, 2018), 10 pgs.
Lin, Chin-Yew, "Rouge: A Package for Automatic Evaluation of Summaries", Text Summarization Branches Out: Proceedings of the ACL-04 Workshop, Barcelona, Spain., [Online]. Retrieved from the Internet: <URL: https://www.aclweb.org/anthology/W04-1013>, (2004), 8 pgs.
Liu, Peter J, et al., "Generating Wikipedia by Summarizing Long Sequences", arXiv preprint, arXiv:1801.10198v1 [cs.CL], (Jan. 30, 2018), 18 pgs.
Lloret, Elena, et al., "The Challenging Task of Summary Evaluation: An Overview", Author preprint, Language Resources and Evaluation, 52:1, 101-148, (2017), 54 pages.
Nallapati, Ramesh, et al., "Abstractive text summarization using sequence-to-sequence RNNs and beyond", arXiv preprint, arXiv:1602.06023v5 [cs.CL], [Online] Retrieved from the internet: <https://www.aclweb.org/anthology/K16-1028>, (Aug. 26, 2016), 12 pgs.
Narayan, Shashi, et al., "Don't Give Me the Details, Just the Summary.", arxiv prepint, arixiv 1808.08745v1 cs.cl, (Aug. 27, 2018), 11 pages.
Paulus, Romain, et al., "A Deep Reinforced Model for Abstractive Summarization", arXiv:1705.04304v3 [cs.CL], (Nov. 13, 2017), 12 pgs.
Peters, Matthew, et al., "Deep contextualized word representations", Proceedings of the 2018 Conference of the North American Chapter of the Association for Computational Linguistics: Human Language Technologies, vol. 1 Long Papers, (2018), 11 pgs.
Radford, Alec, et al., "Improving Language Understanding Generative Pre-Training", author preprint, (2018), 12 pgs.
Radford, Alec, et al., "Language Models are Unsupervised Multitask Learners", author preprint, (2018), 24 pgs.
Rush, Alexander M, et al., "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, et al., "Get to the Point: Summarization with Pointer-Generator Networks", arXiv preprint, arXiv:1704.04368v2 [cs.CL], (Apr. 25, 2017), 20 pgs.
Sennrich, Rico, et al., "Neural Machine Translation of Rare Words with Subword Units", In Proceedings of the 54th Annual Meeting of the Association for Computational Linguistics, ACL Berlin, Germany, vol. 1: Long Papers, The Association for Computer Linguistics, (Aug. 7-12, 2016), 11 pgs.
Sutskever, Ilya, et al., "Sequence to Sequence Learning with Neural Networks", Part of Advances in Neural Information Processing Systems 27 (NIPS 2014), (2014), 9 pgs.
Tu, Zhaopeng, et al., "Modeling Coverage for Neural Machine Translation", arXiv preprint, arXiv:1601.04811v6 [cs.CL], (Aug. 6, 2016), 11 pgs.
Vaswani, Ashish, et al., "Attention is All You Need", 31st Conference on Neural Information Processing Systems (NIPS), arXiv:1706.03762v5 [cs.CL], (Dec. 6, 2017), 15 pgs.
Vinyals, Oriol, et al., "Pointer Networks", arXiv preprint, arXiv:1506.03134v2 [stat.ML], (Jan. 2, 2017), 9 pgs.
Wu, Yonghui, et al., "Googles Neural Machine Translation System: Bridging the Gap between Human and Machine Translation", arXiv preprint, arXiv:1609.08144v2 cs.CL, (Oct. 8, 2016), 23 pgs.
Zeng, Wenyuan, et al., "Efficient Summarization with Read-Again and Copy Mechanism", arXiv preprint, arXiv:1611.03382v1 [cs.CL], (Nov. 10, 2016), 11 pgs.
"U.S. Appl. No. 17/449,405, Notice of Allowance mailed Apr. 29, 2024", 15 pgs.
"U.S. Appl. No. 18/448,675, Response filed Jun. 12, 2024 to Non Final Office Action mailed Mar. 12, 2024", 9 pgs.
"U.S. Appl. No. 17/305,976, Response filed Jun. 25, 2024 to Non Final Office Action mailed Mar. 26, 2024", 10 pgs.
"U.S. Appl. No. 18/448,675, Notice of Allowance mailed Jul. 5, 2024", 12 pgs.
"U.S Appl. No. 17/305,976, Notice of Allowance mailed Jul. 22, 2024", 11 pgs.
"U.S. Appl. No. 18/448,675, Supplemental Notice of Allowability mailed Jul. 30, 2024", 6 pgs.
"U.S. Appl. No. 17/449,405, Corrected Notice of Allowability mailed Aug. 7, 2024", 2 pgs.
"U.S. Appl. No. 17/305,976, Supplemental Notice of Allowability mailed Aug. 9, 2024", 3 pgs.
"U.S. Appl. No. 17/305,976, 312 Amendment filed Sep. 13, 2024", 7 pgs.
"U.S. Appl. No. 17/305,976, PTO Response to Rule 312 Communication mailed Sep. 20, 2024", 2 pgs.
"U.S. Appl. No. 18/448,675, 312 Amendment filed Oct. 3, 2024", 7 pgs.
"U.S. Appl. No. 18/448,675, Supplemental Notice of Allowability mailed Oct. 22, 2024", 6 pgs.
U.S. Appl. No. 18/977,366, filed Dec. 11, 2024, Transition-Driven Transcription Search.
U.S. Appl. No. 18/984,491, filed Dec. 17, 2024, Language Model for Abstractive Summarization.
"U.S. Appl. No. 18/410,621, Non Final Office Action mailed Mar. 24, 2025", 21 pgs.
"U.S. Appl. No. 18/410,621, Examiner Interview Summary mailed Jun. 11, 2025", 2 pgs.
"U.S. Appl. No. 18/410,621, Response filed Jun. 24, 2025 to Non Final Office Action mailed Mar. 24, 2025", 13 pgs.

* cited by examiner

FIVE PRIMITIVES TO UNDERSTAND CONVERSATIONS

SPOT
- DETECT WHETHER SOMETHING WAS SAID

EXTRACT
- EXTRACT A VALUE, TEXT, OR ANSWER MENTIONED

CLASSIFY
- CLASSIFY A TURN INTO A PREDEFINED CATEGORY

REDACT
- FINDS AND REDACTS A VALUE MENTIONED IN THE CONVERSATION

SUMMARIZE
- SUMMARIZE KEY POINTS OF THE CONVERSATION

Agent: John Smith  Customer: James Tyler  Service: Call center_UK | July 23 2021, 11:10 GMT+1 | More 0:00:00 / 0:05:03    ⟲ ▷ ⟳         · 1.0x ▾ ✱ ↓

*Find keywords and phrases* 🔍                                ⚙ ℹ 👍 👎

Agent 0:00:00
Thank you for calling Assurance's enrollment center, my name is [John Smith] and I'm a licensed agent in Mississippi. This call
    AgentName
is being recorded for quality assurance purposes. Who am I speaking with today?
RecordingDisclosure Customer 0:01:32
James Tyler. I'm looking to get a quote on a supplement plan.
             Insurance quote Agent 0:02:00
I'm happy to help you with that before I can get you a quote, I'll need to ask you a few questions.

Agent 0:02:32
Mr Tyler, when were you born?

Customer 0:03:10
DoB: [Redacted DOB]

Agent 0:03:22
Thank you. [Are you a smoker or have you smoked in the last 5 years?]
            Smoke question Customer 0:04:18
Well, I have cut down a lot and I only smoke occasionally. I've been trying to quit for the last few years but it's hard, you
know. It takes time.

Agent 0:05:03
No problem. About how many alcoholic drinks a week do you have?
           Alcohol question Customer 0:05:03
Well, I've cut down a lot and I only drink occasionally with friends. I've been trying to quit for the last few
years but it's hard, you know.

Agent 0:05:03
No problem. What's your ID number?

---

∨ Operator results

☐ Show operators with undetected results

Summarization
The customer Elisha contacts the agent to request an insurance quote. Some info is required before getting a quote and she...
Show more

Sentiment analysis
◉ Positive

Agent Info
[AgentName]

Recording Disclosure
[Recording Disclosure]

PII
[DoB]
[Credit card]
[Order number]

Conversation topics
[Insurance quote]

Callback request

FIG. 11

| Operator name | Description | Scope | Origin | Actions |
|---|---|---|---|---|
| Unavailable Party Detector | Detects if the party being called is unavailable | | Prebuilt | Add to service |
| Do not contact me | Detects requests to avoid being contacted | Phrase Matching | Prebuilt | ○ Added ! |
| Interest Rate Objection | Interest Rate Objection detector | Phrase Matching | Prebuilt | Remove from Service |
| Non English Call | English vs Non English Calls Detector | Transcript classification | Prebuilt | Add to service |
| Escalation Request | Checks whether a customer asks to escalate an issue, such as asking for help from the agent's manager | Phrase Matching | Prebuilt | Add to service |
| Agent Introduction | Checks whether agents introduce themselves correctly | Phrase Matching | Prebuilt | Add to service |
| Recording Disclosure | Identifies where an agent's disclosure a recorded line | Phrase Matching | Prebuilt | Add to service |
| Outbound Call Disposition | Classifies the outcome of the call | Transcript classification | Prebuilt | Add to service |
| Voicemail Detection | Detects likelihood the call went to voicemail | Transcript classification | Prebuilt | Add to service |
| Refund detector | The operator detects customer refund requests. | Phrase Matching | Custom | ○ Added ! |
| New operator | New operator | Transcript classification | Custom | Update to latest |

Customer Conversations

Phrases

Search for phrases in conversations 🔍

✦ CustomerAI Insights

15% increase in Do Not Contact Me request in your customer conversations in the past 7 days;
12% of your message conversations end up with a callback request, 5% in Live Chat, 3% in Email, 2% in Call

Service name: Contact center calls, + 1 more ⓘ

Date Range: Last 30 days ▾   ☰ More filters

Total Conversations
— Call  - - Web Chat  - - - Email  - - - Message
No. of conversations / Days

Compliance related Operators ⃝
☐ Don't Contact Me   ☐ Call Agent Intro   ☐ Call Disclosure
No. of conversations / Days View All →

1189 conversations

| Date & Time | Agent ⓘ | Customer ⓘ | Direction | Duration | Language operator results ⓘ | Actions |
|---|---|---|---|---|---|---|
| 02 July 2023 11:30 BST | John Smith | Jimmy Li | Inbound | 00:01:53 | Call disclosure \| Do Not Contact Me \| Summarization | View ⋯ |
| 02 July 2023 11:28 BST | Jamie Tyler | Andrew Smith | Outbound | 00:02:25 | Callback request \| Call disclosure \| PII \| Summarization \| Sentiment Analysis | View ⋯ |
| 02 July 2023 10:55 BST | Virtual Agent | Content | Inbound | 00:01:53 | Agent Intro \| Callback request \| PII \| Summarization | View ⋯ |
| 02 July 2023 11:08 BST | John Smith | Elisha Su | Inbound | 00:02:25 | Chat escalation \| Do Not Contact Me \| Summarization | View ⋯ |
| 02 July 2023 10:49 BST | Lisa Chen | Amy Tyler | Inbound | 00:01:36 | PII \| Do Not Contact Me | View ⋯ |
| 02 July 2023 10:45 BST | James Wang | Andrew Smith | Outbound | 00:02:25 | Call disclosure \| Summarization \| Sentiment Analysis | View ⋯ |
| 02 July 2023 10:35 BST | Gary Smith | Tim Settle | Outbound | 00:01:36 | Agent Intro \| Don't contact me \| Summarization | View ⋯ |
| 02 July 2023 10:15 BST | John Smith | Bob John | Outbound | 00:01:38 | Call disclosure \| PII \| Summarization | View ⋯ |

1 2 3 4 5 .. 15  ←→

CAPTURING OUTPUT OF LANGUAGE OPERATOR-BASED COMMUNICATION ANALYSIS

CROSS-REFERENCE TO RELATED APPLICATIONS

This application claims the benefit of U.S. Provisional Application No. 63/534,034, filed on Aug. 22, 2023, which is hereby incorporated by reference in its entirety.

TECHNICAL FIELD

The disclosed subject matter relates generally to the technical field of techniques to analyze communications using machine-learning, and in one particular example, to a method and system for analyzing and/or reviewing communications using input guided via one or more user interfaces.

BACKGROUND

The ever-increasing volume of communications (calls, e-mails, messages, and more) between end customers and agents or representatives of entities such as businesses, banks, or agencies has led to significant interest and investment in handling this volume.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 6 is a diagram illustrating types of language operators, according to some embodiments.

Figure 7:
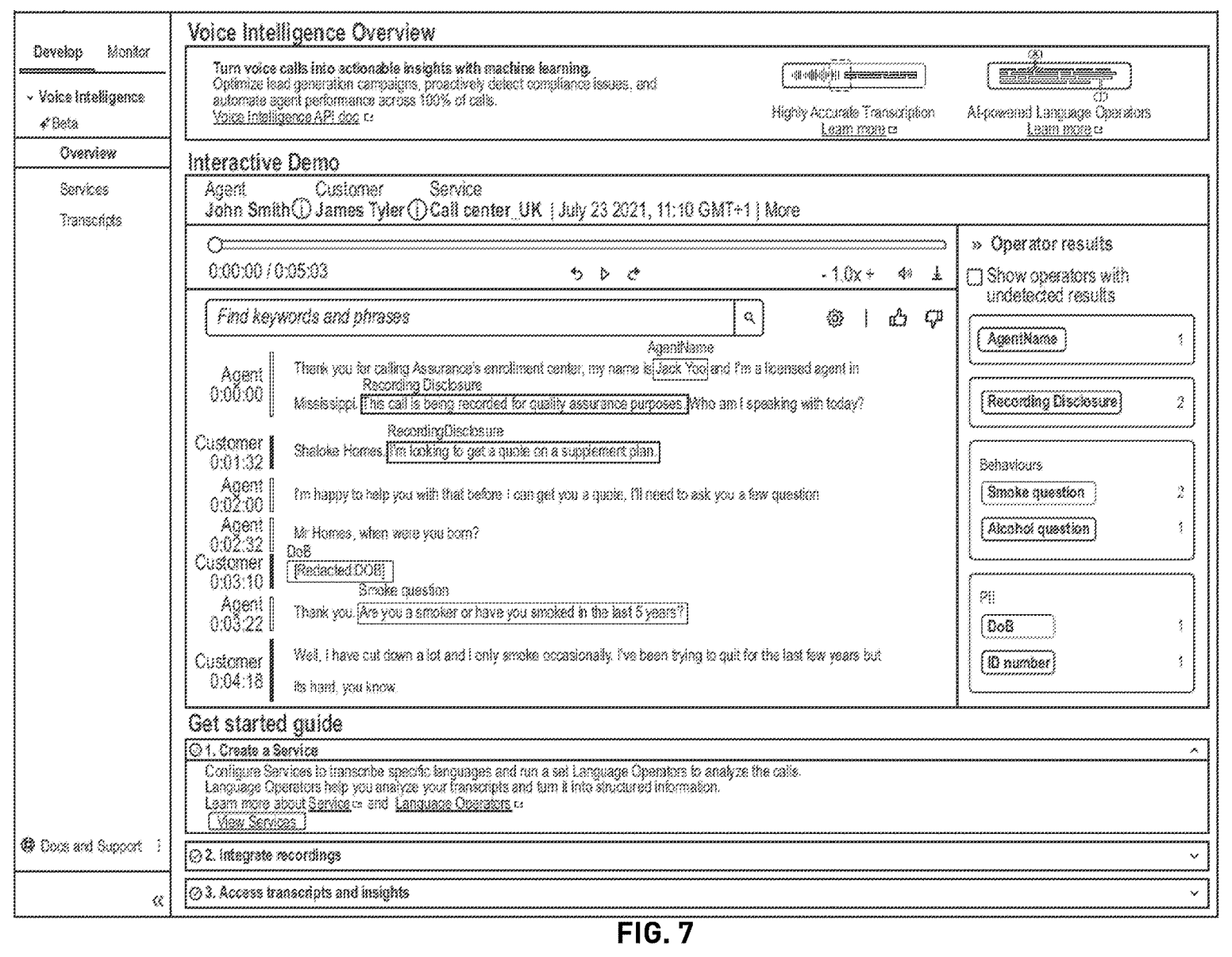

FIG. 7 is an illustration of a view of a user interface (UI) to an EIP, according to some embodiments.

FIG. 8 is an illustration of a view of a UI to an EIP, according to some embodiments.

FIG. 9 is an illustration of a view of a UI to an EIP, according to some embodiments.

FIG. 10 is an illustration of a view of a UI to an EIP, according to some embodiments.

FIG. 11 is an illustration of a view of a UI to an EIP, according to some embodiments.

FIG. 12 is an illustration of a view of a UI to an EIP, according to some embodiments.

FIG. 13 is an illustration of a view of a UI to an EIP, according to some embodiments.

FIG. 14 is an illustration of a view of a UI to an EIP, according to some embodiments.

FIG. 15 is an illustration of a view of a UI to an EIP, according to some embodiments.

FIG. 16 is an illustration of a view of a UI to an EIP, according to some embodiments.

FIG. 17 is an illustration of a view of a UI to an EIP, according to some embodiments.

FIG. 18 is an illustration of a view of a UI to an EIP, according to some embodiments.

FIG. 19 is an illustration of a view of a UI to an EIP, according to some embodiments.

FIG. 20 is an illustration of a view of a UI to an EIP, according to some embodiments.

FIG. 21 is an illustration of a view of a UI to an EIP, according to some embodiments.

FIG. 22 is an illustration of a view of a UI to an EIP, according to some embodiments.

FIG. 23 is an illustration of a view of a UI to an EIP, according to some embodiments.

DETAILED DESCRIPTION

Figure 1:
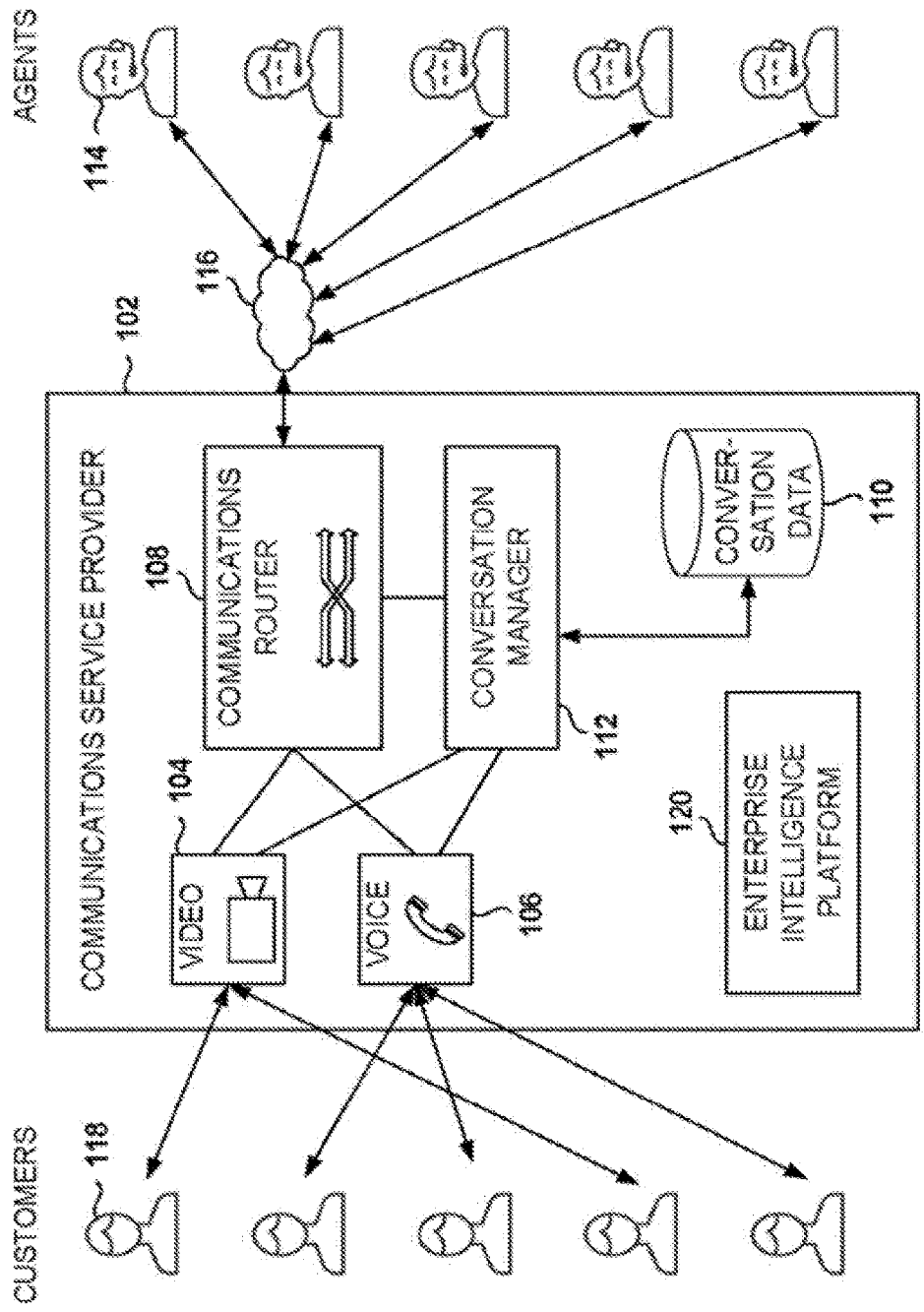
FIG. 1 is a representative diagram showing an architecture of a communications service provider that provides call center services, according to some embodiments.

Embodiments of the described subject matter provide solutions to various problems associated with the ever-increasing volume of communications (calls, e-mails, messages, and more) between entities, such as between end customers and customer service agents, insurance agents and other representatives of businesses, banks or agencies. For example, some embodiments handle one or more of monitoring, triaging, summarizing, or evaluating the communications by the respective entities. Additionally, the resulting analysis of large volumes of stored communications is easy to navigate and act upon by administrators, data scientists, and other users with an interest in understanding the end user experience, the quality of the provided service, or other characteristics of the communications.

Example embodiments disclosed herein refer to a system and method for automatically analyzing and/or summarizing communications using language operators. The system includes an enterprise intelligence platform (EIP) with a UI that allows users to select, construct, or customize language operators. Language operators are modules that categorize communications (or communication portions) into classes (e.g., a language detector operator categorizes transcripts according to the language used), or detect phrases in communications that indicate specific concepts (e.g., Business Competitor), among other examples of operators. Communications can refer to voice calls (including audio content and/or transcripts of calls), text messages, chats, e-mails, or other types of communications. In some embodiments, a communication portion can refer to a fragment or snippet of a communication. In some embodiments, language operators are implemented using machine learning (ML) models. The EIP applies configured language operators to communications such as call transcripts. It then summarizes and visualizes the results in the UI, including interactive elements like operator names, match counts, or other elements. The UI allows users to provide feedback on result accuracy to improve the machine learning models behind the operators.

Example embodiments disclosed herein refer to one or more UIs associated with the EIP. Upon receiving information from a user via the UI, the EIP automatically selects, configures, updates, constructs and/or trains a language operator. Language operators can be added, removed, or tested on one or more stored communications (e.g., as specified by a user via a UI). After one or more language operators are automatically applied to stored communications, the EIP can use one or more UIs to surface corresponding result summaries. In some embodiments, the displayed summaries include interactive UI elements such as the name and/or match count for each operator; words, phrases or communication portions highlighted in the context of a communication transcript, with the highlighted text corresponding to results of applying operators; interactive visual elements (e.g., a thumbs up, a thumbs down) that enable the user to provide feedback on the accuracy of the application of the language operator, or other elements.

Example UIs associated with the EIP can be configured for easy interaction on a variety of displays, from a larger desktop or laptop display to a smaller display such as that of a tablet screen or a smart phone screen. When particular interactive UI elements are selected (e.g., the name of an operator of interest, etc.), the EIP can update a set of displayed UI elements in the current window to surface additional or alternative details, which can be particularly useful in the case of a smaller screen. A UI can display interactive result summaries that optionally rank summary sections and/or summary section language operator elements, and therefore enable easy access of and interaction with surfaced communication data. In some embodiments, upon receiving a selection of an interactive UI element, the EIP can launch a new window within a current UI, enabling the user to enter free-form textual input. In some embodiments, the UI is configured to allow the user to easily provide positive or negative feedback with respect to the accuracy of the automatic extraction or classification results based on applying language operators. The EIP can automatically integrate some or all of a user's feedback in its automatic process of training or retraining models corresponding to language operators, in order to improve the accuracy of language operator-based analysis.

Example embodiments disclosed herein refer to a method and system for automatically analyzing and/or summarizing communications using language operators, where the method receives a definition of a language operator, the definition comprising one or more phrases indicative of a match to a concept associated with a communication. In some embodiments, the method surfaces, in a UI, one or more results of applying the language operator to the communication, the surfacing of each result using an interactive UI element linked to one or more communication phrases, the interactive UI element highlighting a match between the concept and the one or more communication phrases. The surfacing of results can further include surfacing an identifier associated with the language operator, and/or surfacing an indicator associated with the one or more results. In some embodiments, the language operator can be a phrase matching language operator (e.g., an example of a spot operator). The indicator can be the count of respective matches of the operator to the communication.

In some embodiments, the method can include training a machine learned (ML) model to improve an accuracy of the result based on one or more inputs received via the UI. An input can correspond to a user provided indication of confirmation or rejection associated with a result of applying the language operation to the communication. Training the ML model to improve the accuracy of the result can include augmenting a training set for the ML model with one or more training examples derived based on the input received via the UI, where the ML model is used implement the language operator. A training example includes a communication context containing the one or more communication phrases, and/or a label that is either positive or negative. For example, the label is positive if the user confirms the result of applying the language operator is correct and/or complete, and negative if the user rejects the result. The ML model is trained (or re-trained) using the augmented training set. In some embodiments, the method elicits, via the UI, free-form text or audio input from the user.

In some embodiments, the method surfaces, in the UI, multiple language operators, each language operator associated with an identifier, and/or a set of results of applying the language operator to the communication, and/or an indicator associated with the set of results. The language operators can include one or more spot operators (e.g., phrase matching operators or others), classify operators, extract operators, question-and-answer operators, or other operators. The method can surface a ranking of the language operators, where the ranking position of each language operator is determined based on the indicator associated with the language operator. In some embodiments, the indicator corresponds to the number of elements in the set of results of applying the language operator to the communication. In some embodiments, the indicators are categorical indicators, corresponding to a type or class of the language operator, or visual elements like emoticons. In some embodiments, indicators correspond to interactive elements enabled to provide access to specific results.

In some embodiments, the UI enables faceted search over multiple communications, by providing custom filters based on language operators, results of applying the language operators to the communications, metadata like dates, agents, duration, or other options.

In some embodiments, the one or more specialized UIs and/or elements included in the one or more specialized UIs, and/or combinations thereof, are asserted to be unconventional. Additionally, the one or more specialized UIs described include one or more features that specially adapt the one or more specialized UIs for devices with small screens, such as mobile phones or other mobile devices (e.g., by reducing a number of steps needed to access information and/or condensing data items and/or combinations of data items into representations that are suitable for small screens).

Disclosed herein are systems and methods for automatically analyzing and summarizing communications using language operators implemented via machine learning models. One novel aspect is the concept of language operators—modular AI models that categorize, classify, or extract information from communications using natural language processing and machine learning techniques.

Users can customize operators for different concepts by providing example phrases and/or tuning parameters. The use of ML to power highly configurable language operators is unconventional compared to more rigid rules-based NLP approaches seen traditionally.

Further novelty comes from employing recent advances in ML to make operators robust and accurate over time via continuous retraining as user feedback is incorporated. This invention discloses a tight feedback loop between language operator results and front-end visualizations.

Operators are selected and fine-tuned based on interactive visualizations of results from applying them to sample communications. The UI allows for easy positive/negative feedback on result accuracy. This feedback is used to improve the ML models behind operators—another atypical aspect not commonly seen in the art.

Various aspects of the UI are specially adapted for small screens via condensed data representations. This allows users to effectively analyze volumes of communications in a mobile-friendly interface. Optimizing analysis workflows on small screens is an emerging need as mobility becomes ubiquitous. Developing UIs and result visualizations suited for this is novel compared to traditional desktop-centric interfaces.

In summary, described herein is an unconventional machine-learning-based system of customizable language operators for communication analysis. The tight integration of interactive visualizations, user feedback loops, and communication-specific UIs adapted for mobility provide additional areas of novelty.

Focusing on the UIs, multiple UIs are described to allow users to select, configure, apply, and get results from language operators used to analyze communications. Such UIs are specially designed to condense data and optimize workflows on small screens like mobile devices. Examples of such UIs are summarized below.

UI for Selecting Language Operators (FIG. 12)

FIG. 12 exemplifies a UI that displays list of available operators, descriptions, scope (phrase matching, classify calls, etc.). A user can use such as UI to select operators to add to communication channels for analysis. The UI includes options to create custom operators or update existing ones.

UI for Configuring Operators (FIG. 13-17)

The example UIs in FIG. 13-FIG. 17 allow a user to enter a name, and/or description for each desired custom operator. For phrase matching operators, the user can configure phrase sets and match types (e.g., exact or fuzzy matching). Example UIs display operator versions, and are enabled to deploy the language operators for analysis.

UI for Obtaining and Summarizing Operator Results (FIG. 7-11)

Example UIs in FIG. 7-11 summarize results of applying operators. Interactive UI elements let a user browse actual matches in the context of the target communication. Example UIs provide feedback mechanisms (e.g., thumbs up/thumbs down voting) on accuracy of the operator results. Example UIs can provide options to search and filter communications based on operator information.

UI for Communications Analysis (FIG. 19-23)

Example UIs in FIG. 19-23 include a visualization of communication transcripts, analysis status, and/or language operator results. Result summaries can be ranked using metrics such as match count. UIs can have search and faceted navigation capabilities.

As indicated above, the various UIs disclosed herein are enhanced for mobile screens by minimizing steps to access information and representing data concisely. Interactive elements provide easy exploration without overloading small displays.

FIG. 1 is a representative diagram showing an architecture of a communications service provider that provides call center services, according to some example embodiments. In some example embodiments, a communications service provider 102 provides call-center services to facilitate voice and data communications between customers 118 and agents 114.

The agents 114 work for a plurality of companies that use the services of the communications service provider 102. The customers 118 establish video and voice conversations to communicate with the agents 114, such as for requesting support for a product of service.

The customers 118 and agents 114 communicate with the communications service provider 102 via direct connections or through a network 116, such as the Internet or a private network connection.

When a customer 118 requests a video or voice communication with the company, the communications service provider 102 routes the video or voice communications to one of the agents 114 from that company. When an agent 114 initiates the call, the conversation manager 112 routes the call to the customer 118.

During the conversation, a conversation manager 112 records the conversations (e.g., voice data) in a conversations database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and/or terminate conversations, as well as managing the storage of conversation data when requested by the client.

The clients use the conversation data to manage, monitor, and/or improve operations, such as to monitor for compliance by an agent or to determine when a follow up call is requested to further a sales process.

The Enterprise Intelligence Platform (EIP) 120 is a program that analyzes spoken and written customer interactions and provides programmable customization tools for customers to tag, edit, analyze, and/or search the data from the spoken and written customer interactions.

Figure 2:
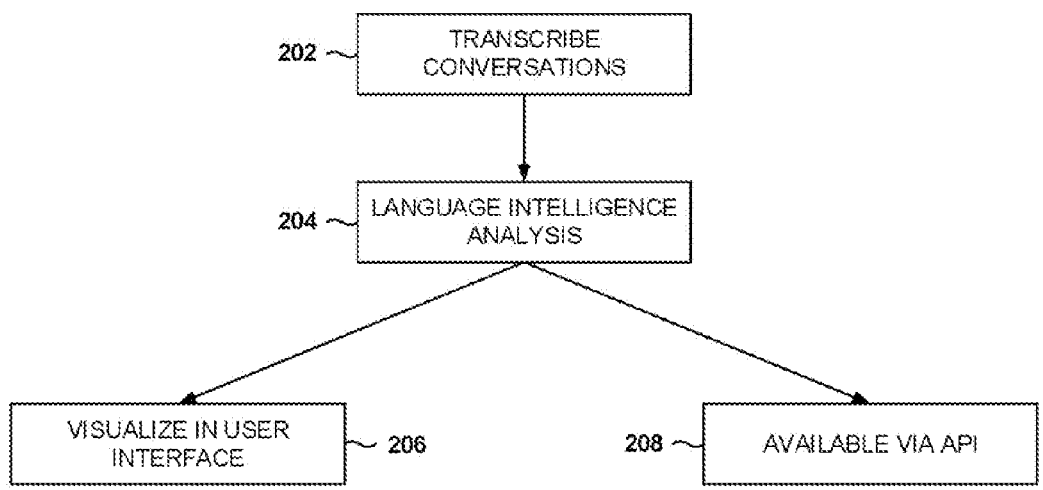
FIG. 2 is a flow diagram showing, at a high level, the communication tools available for analysis or review, according to some embodiments.

FIG. 2 shows, at a high level, communication tools available for analysis and review, according to some embodiments. The example in FIG. 2 focuses on conversations, such as audio conversations between end users and agents, however some or all of the components and/or operations can be applied more generally to communications such as text and/or chat messages, SMS, e-mail communications, or other communications.

The EIP 120 includes tools for transcribing conversations 202, analyzing language within the conversations 204, and/or visualizing 206 the results from the analysis in the UI. The EIP 120 provides tools for search, and/or for accessing conversation data via an Application Programming Interface (API) 208.

In some example embodiments, the EIP 120 analyzes the conversation data offline; that is, the EIP is not active in trying to guide the conversation, although, in some example embodiments, the EIP 120 can also analyze data real-time to provide real-time information.

Transition-driven search refers to the ability to search conversation data based on the natural turns in the conversation between the two participants and based on an analysis of the content within each turn and how multiple turns relate to each other, such as when multiple turns refer to the same topic (e.g., agent providing their name to the caller). With transition-driven search, the customer is able to filter based on how the conversational turns change throughout the conversation. Here are a few embodiments:

Find all calls where the agent asked the customer for their name and the customer did not answer;

Find all calls where the customer objected after the interest rate for the loan was quoted; or Find all calls where the agent asked for consent for recording the call, but no customer confirmation was received.

As these embodiments show, EIP provides great flexibility for searching through thousands of conversations to find events that can be difficult to find through standard text searches, or that would require power, memory, or other system resources to scan through all the conversations.

Figure 3:
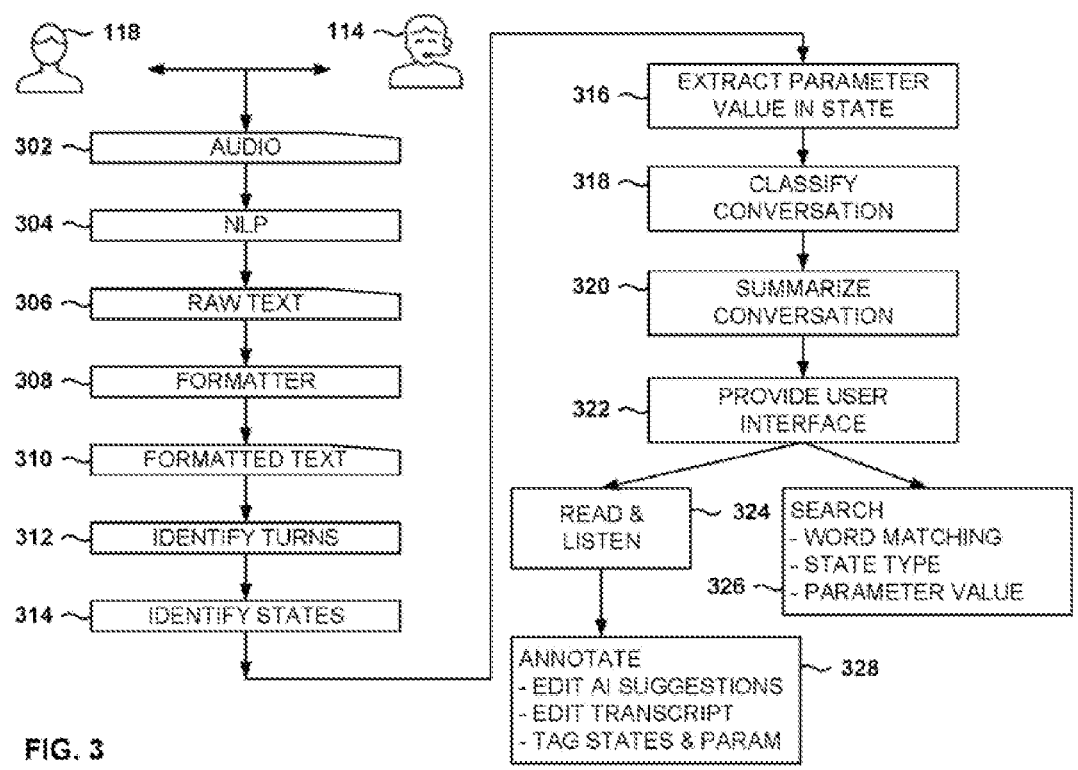
FIG. 3 is a flow diagram showing the use of different tools for communication analysis or review in an enterprise intelligence platform (EIP), according to some embodiments.

FIG. 3 is a sample flow diagram showing the use of different tools for communication analysis and/or review in an EIP 120, according to some example embodiments. While the various operations in this flowchart are presented and described sequentially, one of ordinary skill will appreciate that some or all of the operations can be executed in a different order, be combined or omitted, or be executed in parallel. While the diagram refers to a conversation (e.g., call or voice interaction) merely for the sake of example, some or all of the components and/or operations can be applied to communications in general, for example including text and/or chat messages, SMS, e-mail communications, or other communication types.

At operation 302, the audio of a conversation is captured, and at operation 304, natural language processing (NLP) is used to analyze the audio of the conversation to generate the raw text 306. The raw text 306 is a list of words identified in the conversation, without including commas, periods, or any other punctuation marks that help identify sentences within the conversation.

The formatter 308 takes the raw text 306 and formats the text into plain English sentences, such as by dividing the raw text 306 into sentences, adding periods and commas, capitalizing beginning of sentences and proper names, etc. The result is that formatted text 310.

After the formatted text 310 is available, the turns in the conversation are identified at operation 312, where each turn represents the words spoken by one of the parties without interruption by the other party.

Identifying turns (e.g., identifying a question and a corresponding answer) is not a simple proposition because it involves more than just identifying two turns within the conversation. Sometimes, it can take several turns to ask a question and get an answer. For example, there are several types of questions that cause some people to be reluctant to respond, and it can take several turns of restating the question to get a clear answer, such as asking if the caller is a smoker.

Further, the exact words used to ask the question do not matter, as long as the question is asked. Therefore, the ML model can identify multiple ways of asking the same question as a simple text search can fail.

At operation 314, an EIP 120 identifies states within the conversation, where each state refers to a portion of the conversation associated with a single topic (e.g., providing the name of the party, quoting a price for a good, obtaining contact information, etc.). A state can include one or more turns, because a participant can require multiple turns to provide certain information (e.g., one turn providing name as "John," agent asking for full name, customer providing "John Doe"). In some embodiments, detecting such a conversation state can be accomplished via one or more operators, as described in more detail at least FIG. 4.

Further, at operation 316, one or more of the identified states are analyzed to extract a parameter value. For example, for a state where a name is provided, the name is extracted; for a phone-number state, the phone number is extracted; for a quote of an interest rate, the interest rate is extracted; for a state where the client identifies if the client is a smoker, smoker or no smoker is extracted, etc. In same example embodiments, an ML model is used to extract the parameters. In some embodiments, the extraction of a parameter value (e.g., using a ML model) can be implemented as part of a language operator (e.g., see FIG. 4).

At operation 318, the conversation is classified according to one of a plurality of possible classification values. For example, the classification values include a positive outcome, a neutral outcome, or a negative outcome. In another example, the classification values can include a sale was made or a sale was not made.

At operation 320, a summary of the conversation is created. In some example embodiments, the salary is a textual abstract of the content of the conversation. In some example embodiments, the summary is generated by an ML model.

At operation 322, a UI is provided to the user, where the UI includes multiple options for examining conversations, including reading, listening to the conversations 324, or performing searches 326. The UI provides an option to annotate 328 the conversation, such as to edit the suggestions generated by the AI models, edit the transcript suggested by the NLP, tag the states, and validate values of identified parameters.

The search 326 can be of different kinds, such as word matching (e.g., word search), search by state type (e.g., agent identified herself), or by parameter value (e.g., caller lives in California), or a combination thereof.

Figure 4:
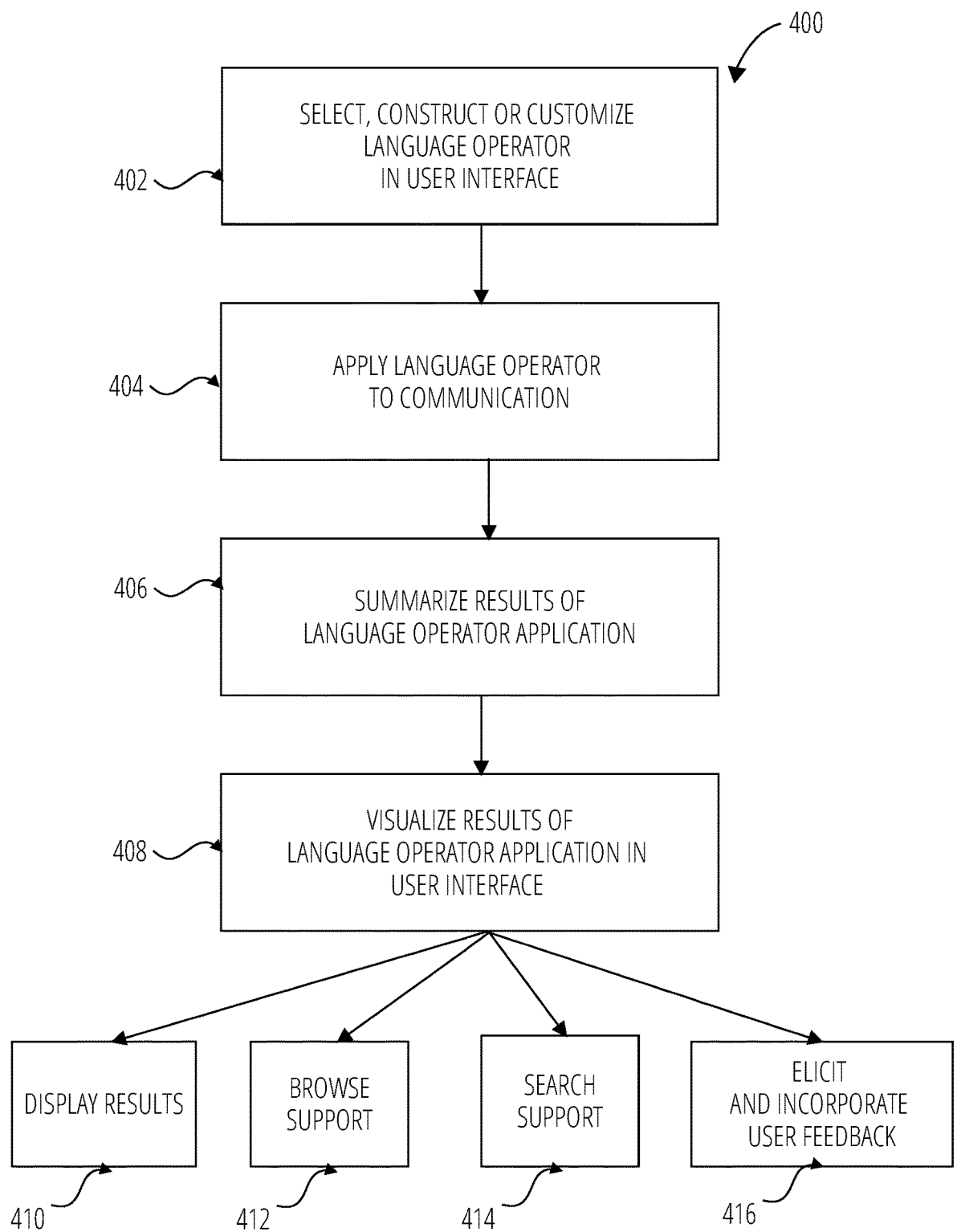
FIG. 4 is a flow diagram showing the use of language operators for communication analysis or review in an EIP, according to some embodiments.

FIG. 4 is a flow diagram showing the use of language operators for communication analysis and review an enterprise intelligence platform (EIP).

At operation 402, EIP 120 enables a user to use a UI to select, construct, or customize a language operator. In some embodiments, a language operator refers to a specialized module that categorizes or classifies a communication into one of multiple classes (e.g., a language detector that classifies a communication with respect to one of a set of languages, etc.). In some embodiments, the categorizer or classifier operates on one sentence in a communication, or on multiple sentences (adjacent or not). Examples of such language operators can be seen at least in FIG. 12. In some embodiments, a language operator refers to a module that detects that one or more phrases in a communication (e.g., in a communication portion such as a sentence, etc.) correspond to a pre-specified concept. For example, a Refund Detector can identify a sentence or specific phrases in a sentence that correspond to a refund request. In some embodiments, a user initializes or augment the definition of such operators by providing example phrases that could correspond to an expression of a given concept. The system can either identify example matching phrases in a target communication, or can identify conceptually similar phrases likely to correspond to the same underlying concept. Examples of such phrase matching language operators for concept identification can be seen at least in FIG. 12. In some embodiments, a language operator refers to a module that performs the extraction of a parameter value (e.g., from a raw communication portion or from a previously extracted and/or labeled communication portion). For example, as indicated in FIG. 3, for a state where a name is provided, the name is extracted; for a phone-number state, the phone number is extracted; for a quote of an interest rate, the interest rate is extracted; for a state where the client identifies if the client is a smoker, smoker or no smoker is extracted.

In some embodiments, language operators are implemented by the EIP 120 using one or more machine learning (ML) models (e.g., text classification models, sequence labeling models, and so forth). In some embodiments, new operators are constructed (e.g., using ML models or otherwise) based on user input provided via a UI. In some embodiments, a pre-trained operator selected by a user via a UI, can be extended to accommodate a novel use case, for example by augmenting and/or replacing a set of example phrases indicative of a pre-specified concepts.

At operation 404, the EIP 120 applies one or more given language operators to a target communication. In some embodiments, the target communication is the transcript of a call (e.g., between a caller and an agent). The target communication can be a spoken conversation or series of one or more text or audio messages, or other communications. By applying a language operator to a target communication, the EIP 120 categorizes or classifies part of or whole of a communication, or labels one or more occurrences of a target concept, in the form of marking one or more phrases indicative of the target concept for each such occurrence in the communication.

At operation 406, the EIP 120 summarizes the results of applying the one or more language operators to a target communication.

At operation 408, EIP 120 presents such a summary and/or select results of applying the language operators to the target communication as part a UI.

In some embodiments, the EIP 120 displays the summary and/or selects results (e.g., see operation 410). For example, the EIP 120 can display a listing of at least the relevant operators, the number of matched or found occurrences of respective target concepts, and/or the number of communication portions classified with respect to given classification or categorization scheme (for the relevant type of language operator). The presentation can include user-actionable UI elements, as seen for example at least in FIG. 7 and FIG. 8.

In some embodiments, the EIP 120 implements support for a user to browse through the presented summary and/or specific conceptual occurrences and/or specific communication and communication portion classification results. Additionally, the user can inspect not only a summary of language operator results, but also specific instances of applying the one or more language operator within the conversation itself (see, again, at least FIG. 7 and FIG. 8).

In some embodiments, the EIP 120 implements support for a user to perform various types of searches (e.g., keyword search, faceted search, etc.) over one or more communications (e.g., in the form of transcripts, conversations, etc.). Examples embodiments are illustrated at least in FIG. 7, FIG. 21, or FIG. 22.

Figure 9:
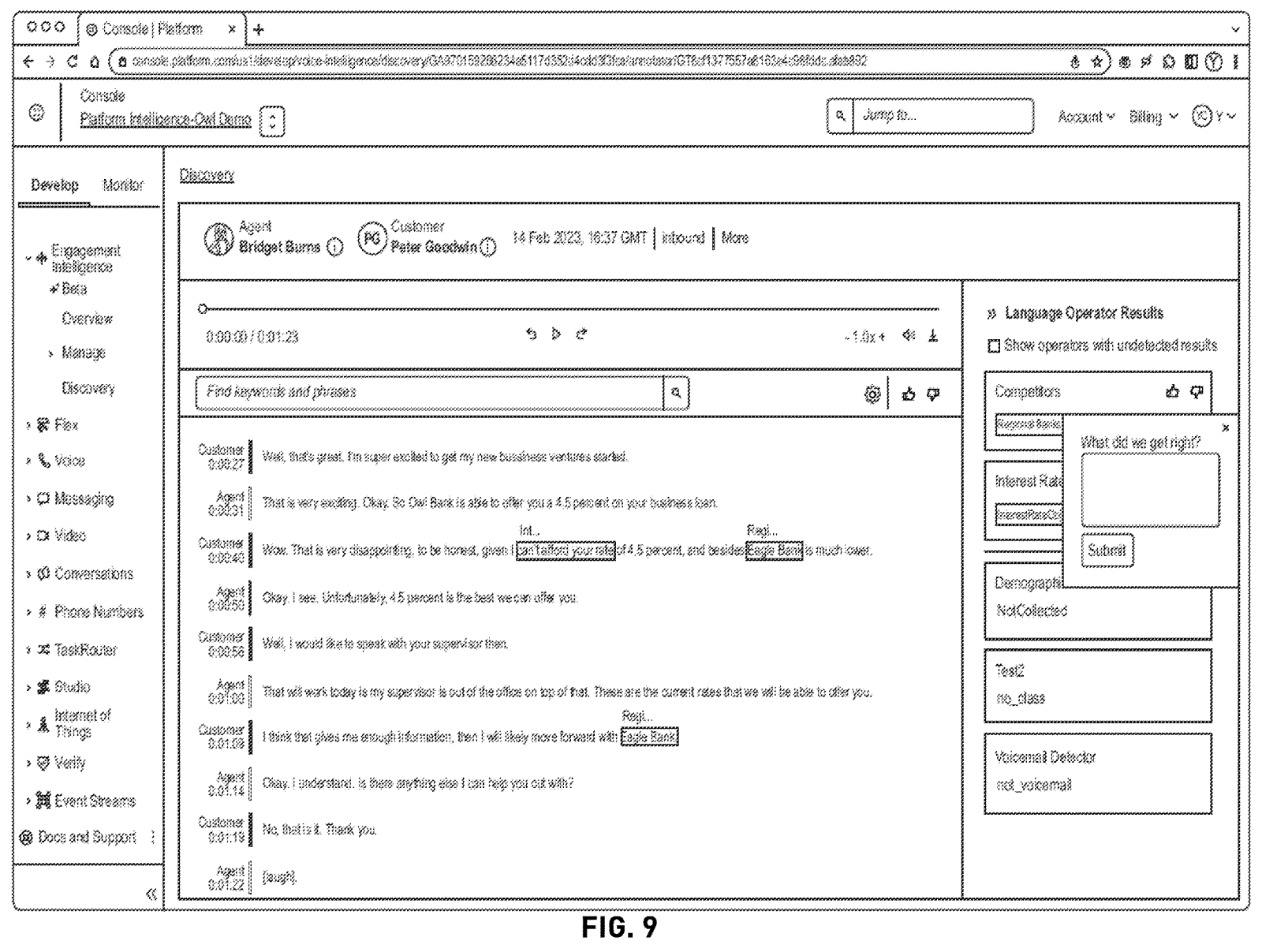

In some embodiments, the EIP 120 elicits and incorporates user feedback with respect to the quality and/or usefulness of the automatic application of the language operator to the target communication (e.g., see at least FIG. 9 for embodiments of UI elements soliciting and accepting feedback from a user).

Figure 5:
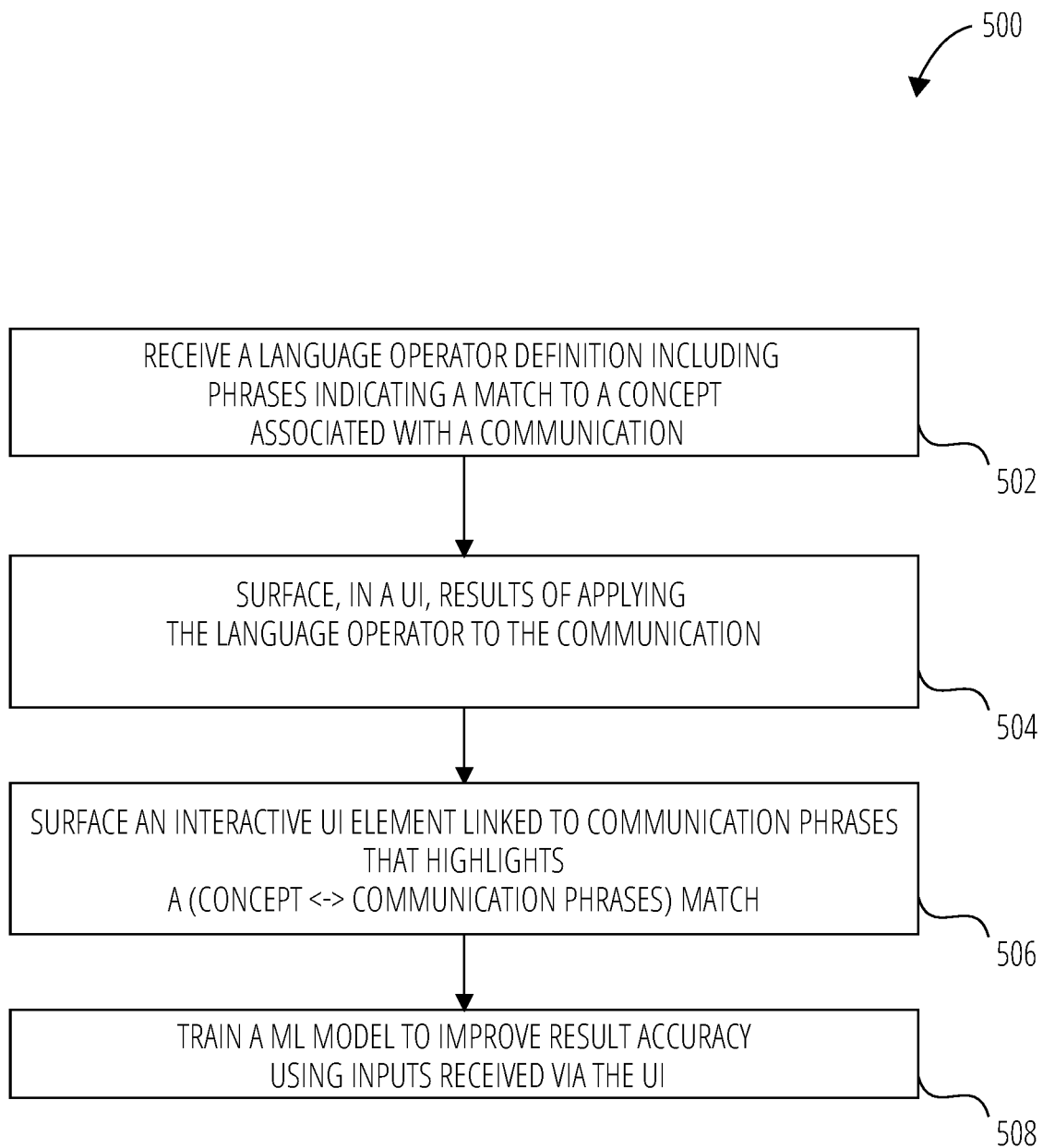
FIG. 5 is a flowchart illustrating a method as implemented by an EIP, according to some embodiments.

FIG. 5 is a flowchart illustrating a method as implemented by an EIP 120, according to some embodiments.

At operation 502, the EIP 120 receives a definition of a language operator, the definition comprising one or more phrases indicative of a match to a concept associated with a communication. At operation 504, the EIP 120 surfaces, in a UI, one or more results of applying the language operator to the communication. The surfacing of each results involves the use of an interactive UI element linked to one or more communication phrases, the interactive UI element highlighting a match between the concept and the one or more communication phrases (see 506). At operation 508, the EIP 120 trains a machine learned (ML) model to improve an accuracy of the result based on one or more inputs received via the UI.

FIG. 6 is a diagram that illustrates types of language operators used to understand communications (e.g., conversations), according to some embodiments (see also FIG. 4).

In some embodiments, the language operators include spot, extract, classify, or summarize operators, among others. A spot operator detects whether something was said in the conversation, such as finding particular words of interest (for example, using phrase matching). An extract operator extracts information from the conversation, such as a parameter value, one or more words, or the answer to a question. A classify operator classifies a conversation or a conversation portion, for example in order to find a turn within the conversation. A redact operator finds and/or redact a parameter value mentioned in the conversation. A summarize language operator provides a summary of the key points from the conversation, such as an abstract of a text document. In some embodiments, a question-and-answer operator (Q&A) can be used for finding turns in a conversation that include a question and a corresponding answer. It is noted that it can take multiple turns in the conversation to state a question or to obtain the answer; therefore, the Q&A operator can look beyond observing pairs of turns for questions and answers.

The different operators can be combined to perform the communication analysis, such as using the classify operator or spot operator to find types of portions or annotations within the conversation, and the extract operator to find parameter values within the identified annotations.

In some embodiments, an operator can be implemented using multiple ML models (e.g., by combining a classification model and an extraction model, or a classification model and a spot model, etc.).

FIG. 7 is an illustration of a view of a UI to an EIP 120, according to some embodiments. In some embodiments, the UI includes interactive UI elements, that allow the EIP 120 to detect and/or receive user input. In some embodiments, the UI includes information about setting up a service (e.g., a channel or aggregation of communications with one more common properties, for example "sales calls"), integrating communications (e.g., filtering communications such as calls into a defined or specified service, transcribing calls, etc.), and/or accessing communication transcripts and/or insights, where the insights are the result of applying service-specific language operators to one or more target communications. Subsequent to detecting user input relating to viewing services and/or language operators, the UI automatically presents follow-up screens which allow a user to select, construct, or customize language operators, add them to specific services, and apply them to the communications available through those services (e.g., see at least FIG. 12-FIG. 22 for embodiments).

Figure 8:
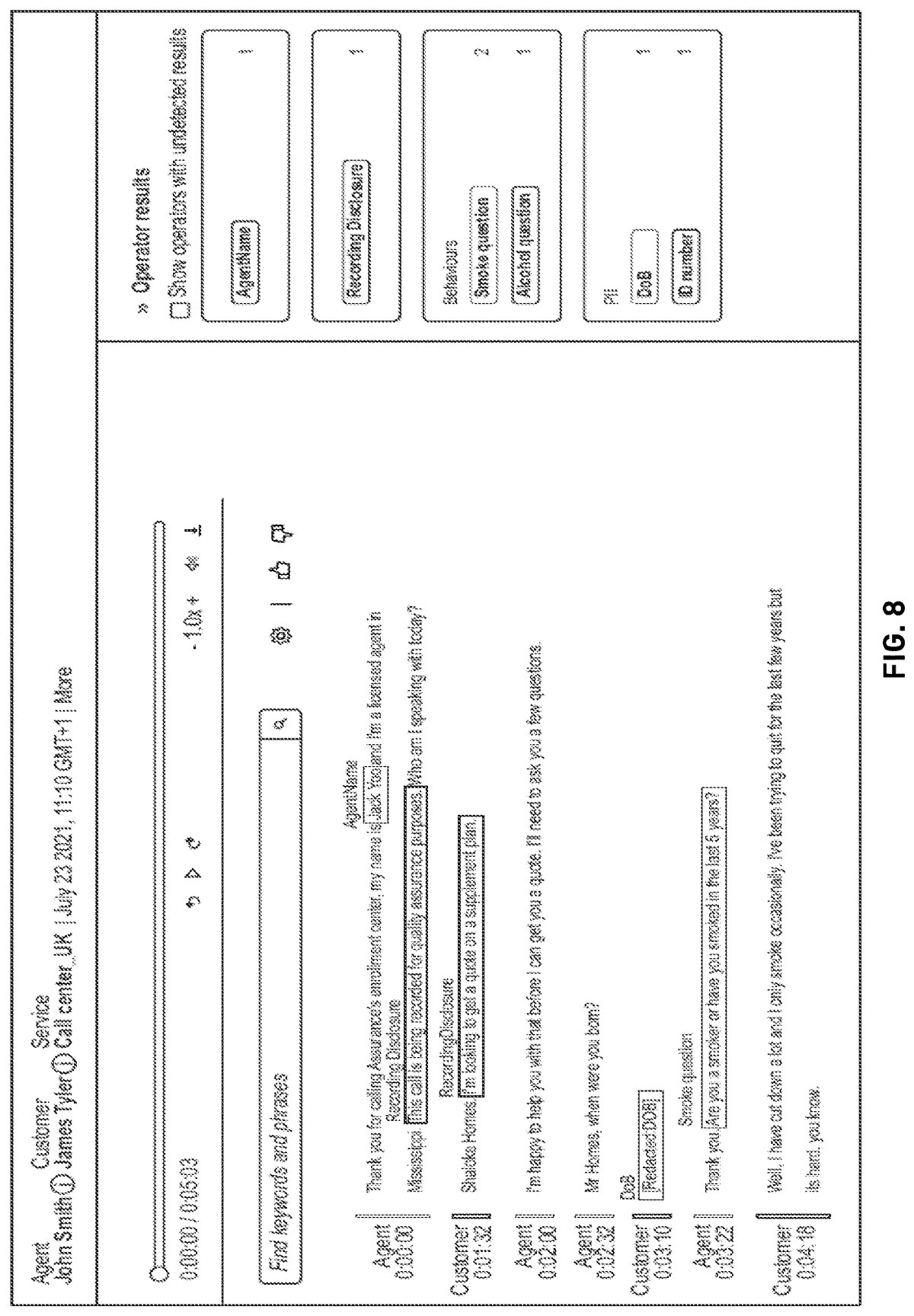

FIG. 8 is an illustration of a view of a UI to an EIP 120, according to some embodiments. In some embodiments, the UI includes interactive UI elements that allow the EIP 120 to detect and/or receive user input. In some embodiments, the UI displays a summary of the results for one or more language operators enabled for a specific service. In some embodiments, the results summary reflects the results of applying the enabled operator(s) to a target communication. The summary can include a count of matches or successful applications for each language operator (e.g., conceptual matches, classified portions matching the definition of a target operator, etc.). The summary can include one or more sections, each section corresponding to a language operator type, with the type being indicated by a pre-defined taxonomy over the set of language operators. For example, FIG. 8 includes a "Behaviours" summary section comprising a listing of two-behavior related language operators and respective match counts. In some embodiments, a summary section can rank the language operator elements with respect to one or more ranking criteria, for example, by listing the language operators in the order imposed by the number of matches (e.g., here, the "Smoke question" is listed ahead of the "Alcohol question"). Other ranking types include alphabetical ranking, a user-supplied ranking (for example, the user can be interested in always seeing a specific language operator first), or other types of rankings. In some embodiments, the summary sections within a summary can be ranked based on one or more ranking criteria, such as a normalized relative number of overall matches for the language operators in each section, alphabetical order of the operator type or category, or other criteria.

The summary can include categorical indicators (e.g., marking that a call disclosure was found or not in a particular communication). In some embodiments, the summary can include visual elements (e.g., emoticons, other graphics) corresponding to a numerical and or categorical value (see, for example, the "Sentiment Analysis" operator example in FIG. 10).

In some embodiments, the EIP 120 displays highlights for some or all of the occurrences and/or matches corresponding to all the successfully applied language operators. In some embodiments, UI space is limited, or a large number of language operators is enabled for a specific service, leading to a larger number of successful operator applications. In such cases, EIP 120 enables selective display and further exploration, based on pre-specified priority values for each operator and/or real-time user input. For example, summary entries (e.g., listed names or identifiers for specific operators) can be interactive UI elements: when clicking on a "Smoke question" entry corresponding to a "smoke question" operator with two successful applications in the currently displayed communication, the EIP 120 marks or further highlight the corresponding occurrences or matches for the "smoke question" operator within the displayed text of the communication.

In some embodiments, highlighted phrases and/or communication portions corresponding to successful applications of language operators are interactive UI elements, or are associated with interactive UI elements) For example, subsequent to the EIP 120 receiving a selection of a highlighted phrase (e.g., "I am looking to get a quote on a supplement plan", the EIP 120 is enabled to perform further actions related to the highlighted text. The EIP 120 can offer the user one or more follow-up options (not shown): the option to hear the original audio likely to correspond to the transcribed phrase (e.g., in order to doublecheck the transcription), an option of seeing similar results, an option to use the phrase as a search phrase (e.g., in the context of a text search option or faceted search option), an option of viewing other instances of the same phrase in other conversations, or other options.

In some embodiments, the EIP 120 is enabled to detect a user's selection of interactive UI elements providing feedback as to the quality and/or completeness of the results of applying the language operators (see FIG. 9 for more details).

In some embodiments, interactive UI elements include search boxes—for example, EIP 120 can enable the service data to be searched using user-provided text input and/or audio and/or image data. Search can also be implemented as faceted search, with the UI including elements corresponding to facets and/or filters which can be selected by the user. Example filters include a date range filter, or selecting a different service for inspection (see at least FIG. 22 for additional embodiments).

FIG. 9 is an illustration of a view of a UI to an EIP 120, according to some embodiments. In some embodiments, the UI includes interactive UI elements that allow the EIP 120 to detect and/or receive user input. For example, the EIP 120 can be enabled to detect user's selection of interactive UI elements providing feedback as to the quality and/or completeness of the results of applying the language operators.

In some embodiments, the UI is enabled to allow the user to provide feedback associated with a language operator as listed in a result summary (e.g., see the "Competitor" language operator). Upon detecting the selection of a UI element associated with negative or positive feedback (e.g., a thumbs down or a thumbs up), the EIP 120 can solicit additional information, for example via a text box, asking for additional details/feedback from the user.

In some embodiments, the UI is enabled to collect feedback from a user with respect to specific occurrences and/or in-context application of a language operator. For example, upon detecting a user clicking on a highlighted phrase (e.g., an interactive UI element) representing a match and/or extraction corresponding to a Competitor operator (e.g., "Eagle Bank," as an example of a Regional Competitor), the EIP 120 allows the user to further provide negative and/or positive feedback with respect to the specific phrase. The user can click on a thumbs up or on a thumbs down visual UI element, providing information as to whether the specific language operator application was correct and/or complete (or not). As detailed above, the EIP 120 can enable the UI to collect further information from the user as needed.

In some embodiments, the EIP 120 automatically incorporates user inputs and/or feedback with respect to the correctness and/or completeness of language operator-based extractions, matches, labeling, or classifications. For example, given a language operator implemented using a ML model, the EIP 120 can augment an existing training set (containing positive and negative examples of applying a language operator), with additional training and/or test examples, constructed based on positive and negative user inputs (e.g., labels) associated with portions of the target communication. In some embodiments, the EIP 120 can automatically collect, validate, and/or sample user input information before integrating it into the training or re-training of a ML model for a language operator. The validation step can include using labeled examples where at least K users have given positive and/or negative feedback, using labeled examples with feedback from multiple users such that all the users (or most of the users) provide either a positive or a negative input, and so forth. User input can be weighted and/or discarded based on various user characteristics (e.g., some users can be professional editors and/or annotators whose input is assumed to be of high quality, etc.).

By incorporating user input with respect to surfaced applications of a language operator into the training and/or development of the model, the EIP 120 automatically improves the overall performance (e.g., accuracy) of the model over time.

In example embodiments, the EIP 120 utilizes type of an AI model, such as a neural network framework, for its language operators, which classify communications using a model previously trained on sets of sample data. However, prior AI model methods for communication analysis suffer from an inability to robustly analyze communications where there are shifts, distortions, and variations in terminology and phrasing used in the communications over time.

To address this issue, the EIP 120 uses a combination of features to more robustly implement its language operators. First, expanded training sets of communications can be used to train the AI models powering each language operator. These expanded training sets can be developed by applying textual transformations to acquired sets of communications. For example, synonyms of key phrases can be substituted, terminology over time can be modernized or antiquated, and abbreviations can be introduced. The AI models are then trained with these expanded training sets (e.g., using back-propagation techniques).

The introduction of expanded training sets can increase false positives when analyzing communications. Accordingly, the second feature of EIP 120's technique is the minimization of these false positives by performing an iterative training algorithm. In this iterative process, the AI models (e.g., neural networks) can be retrained with updated training sets containing communications that were incorrectly analyzed after language operators had been applied.

This combination of an expanded and iteratively-refined training set provides language operators that can accurately analyze communications even when there are shifts and variations in terminology and phrasing, while limiting false positives.

FIG. 10 is an illustration of a view of a UI to an EIP 120, according to some embodiments. In some embodiments, the UI includes interactive UI elements that allow the EIP 120 to detect and/or receive user input. In some embodiments, the UI displays a summary of the results for one or more language operators enabled for a specific service. The results summary reflects the results of applying the enabled operator(s) to a target communication (see FIG. 8 for more details). Selected language operators can include a "Summarization" language operator, which generates a free-form text summary of the highlights of the communication (optionally taking into account earlier results of applying other language operators to the communication). In some embodiments, language operators can therefore be applied to a communication in stages, with outputs at an earlier stage being potentially used by later-stage language operators. In some embodiments, the summarization functionality can be implemented outside of the language operator development and deployment pipeline (for example, as a downstream module taking input from the successful application of language operators to the specific communication). In some embodiments, the text summary is automatically generated (e.g., for example, using a generative ML model and/or taking into account the results of applying the one or more language operators to the target communication).

Figure 11:
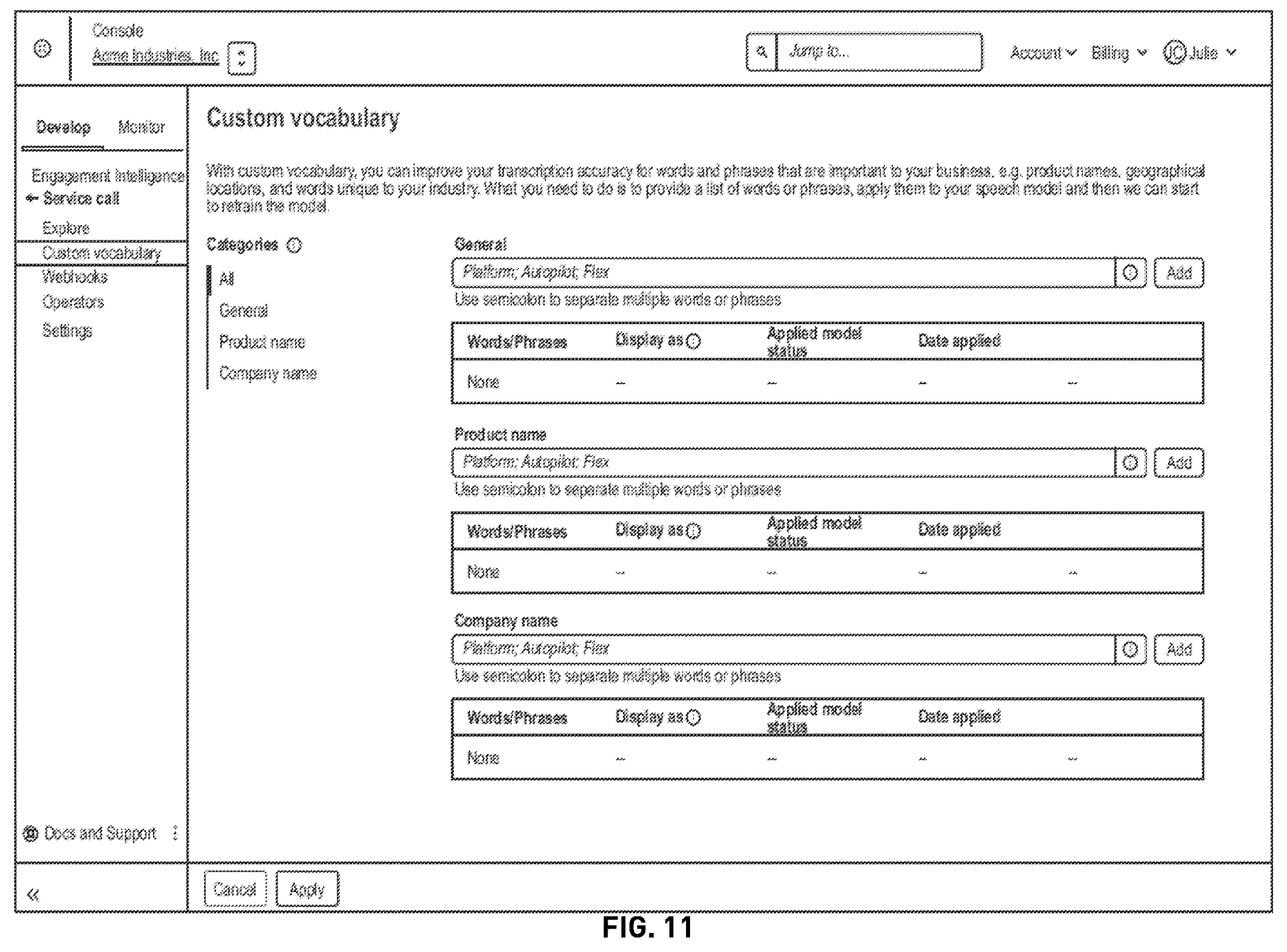

FIG. 11 is an illustration of a view of a UI to an EIP 120, according to some embodiments. In some embodiments, the UI includes interactive UI elements such as drop-down menus and menu buttons, text input boxes, and/or other elements. For example, EIP 120 can be enabled to collect, via the UI, phrases corresponding to product or company names of particular interest to a user, apply them to a speech model, and retrain the model in order to achieve better transcription accuracy.

FIG. 12 is an illustration of a view of a UI to an EIP 120, according to some embodiments.

The UI in FIG. 12 includes information about available language operators which can be used to analyze communications if added to a communication channel analysis (e.g., to a service) by a user. The UI includes one or more interactive UI elements, which allows the user to perform one or more actions related to one or more language operators. For example, the UI includes a "Create Operator" element: upon the element receiving input from the user, the EIP 120 automatically starts a creation and testing flow for a new language operator (e.g., see at least FIG. 13-FIG. 18).

In some embodiments, the UI includes a listing of names of one or more language operators (e.g. "Escalation Request"), associated descriptions of their functionality (e.g., "checks if customer wants to escalate issue"), descriptions of their scope or type (e.g., phrase matching, for the respective escalation request operator, or classification at the level of transcript, etc.), provenance or origin (e.g., already available/pre-built operator, custom operator constructed or customized by user), or potential operator-related actions for an available operator (e.g., add operator to a service, remove operator from a service, update to a latest version of the operator etc.). Upon a user interacting with interactive UI elements such as action elements, the EIP 120 automatically modifies one or more available operators or updates the set of language operators associated with a specific service. Upon a user interacting with interactive UI elements such as operator name fields, the EIP 120 automatically retrieves and displays information associated with a specific operator as part of the same or a separate UI window.

Figure 13:
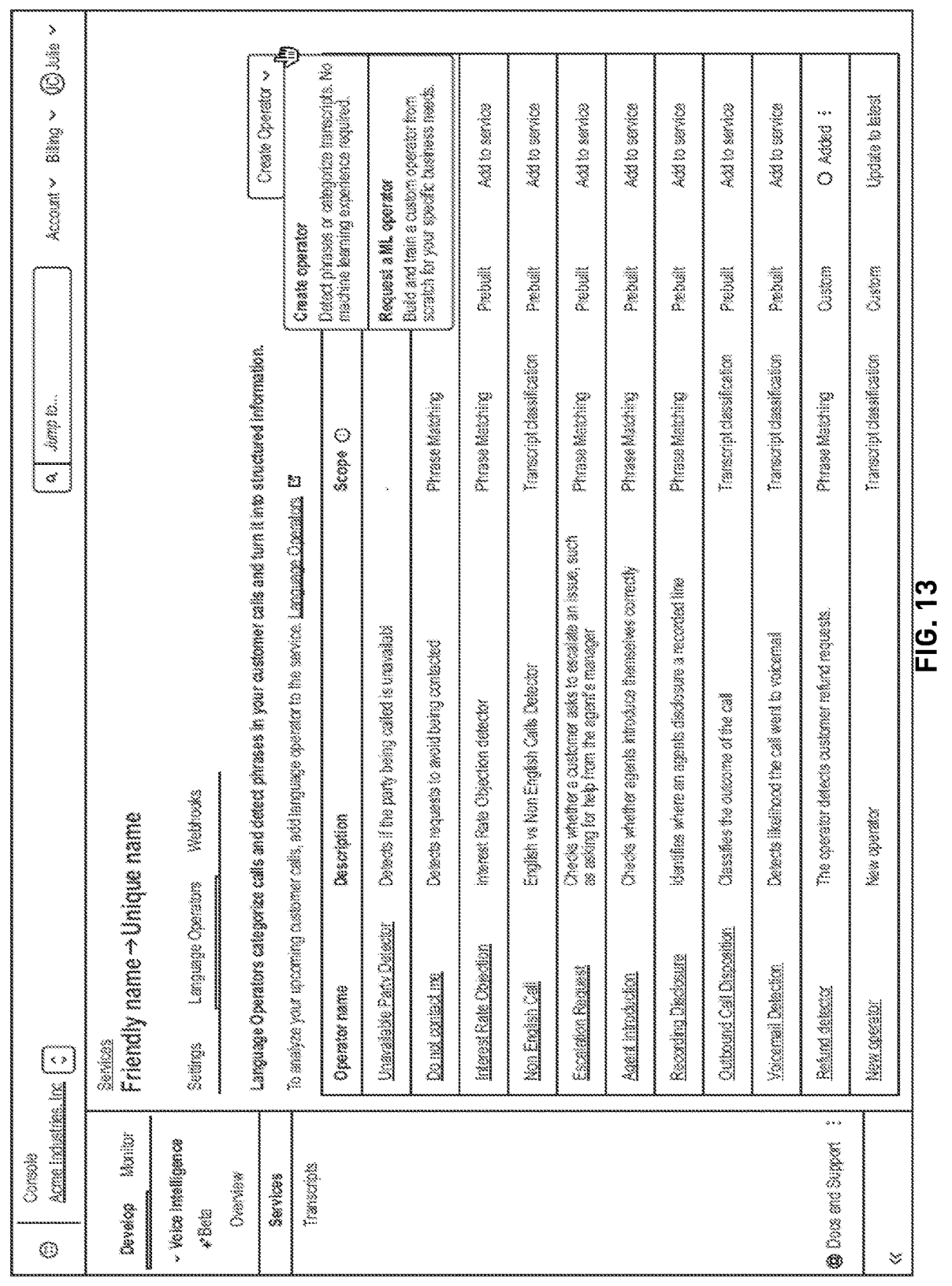

FIG. 13 is an illustration of a view of a UI to an EIP 120, according to some embodiments. In some embodiments, upon detecting a user selection to create an operator (e.g., the selection of the "Create Operator" option), the UI displays options to create a ML-based operator or a non-ML operator. Additionally, the UI includes interactive elements that allow the user to select creating a "pre-trained" operator that is already available in a library, or a fully custom operator. FIG. 13 includes examples of prebuilt operators of various types (e.g., see the "Scope" field).

Figure 14:
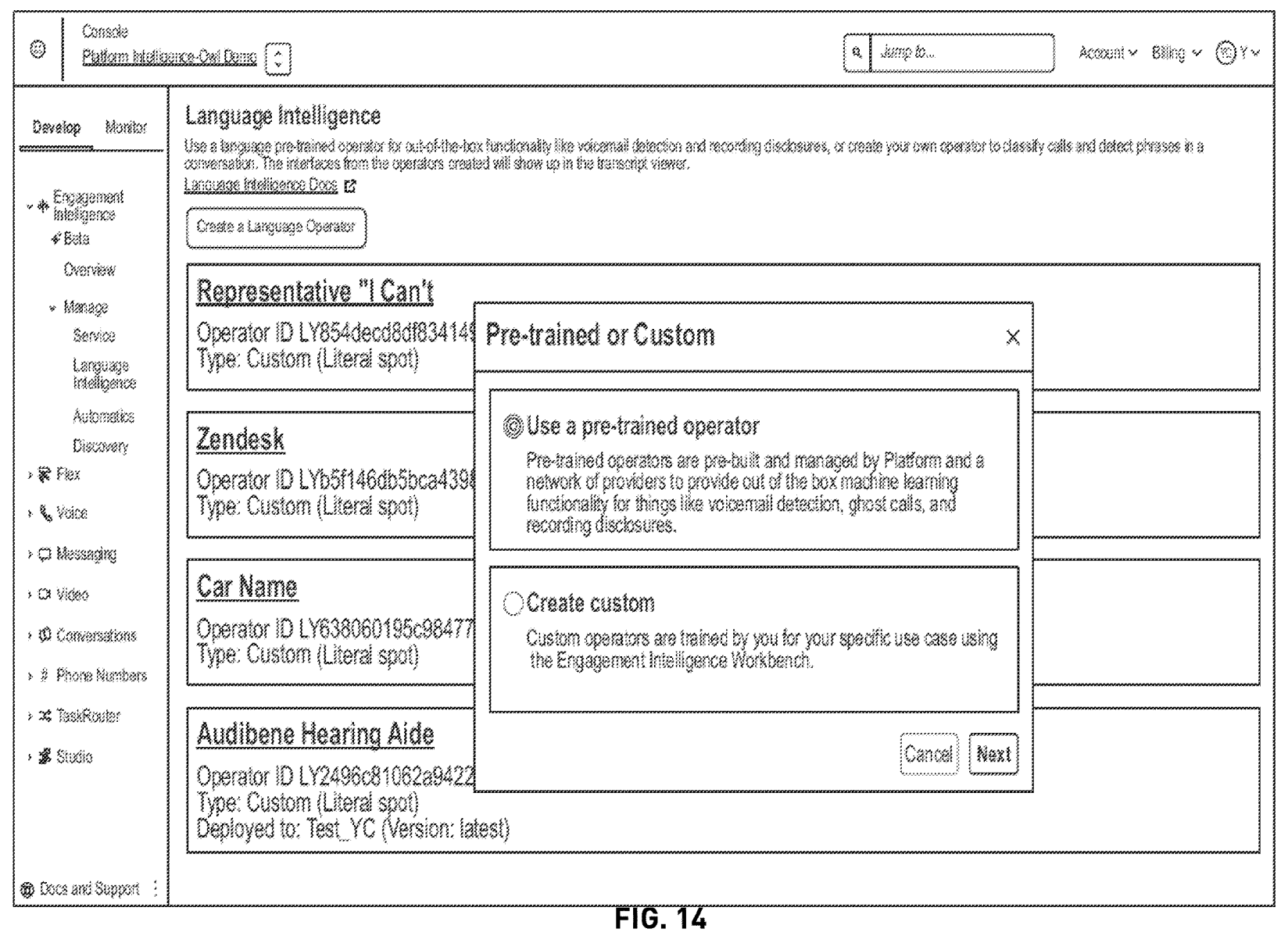

FIG. 14 is an illustration of a view of a UI to an EIP 120, according to some embodiments. The UI allows the user to select either creating a pre-existing operator or a completely new, custom-built operator to meet specialized requirements, as the next step after choosing to initialize an operator in general as depicted in the prior FIG. 13.

For example, upon receiving the selection of a "Use a Pre-trained Operator" option, the EIP 120 can display further information about a library of pre-trained operators covering use cases common across users or customers (e.g., detecting ghost calls, voicemail detection, recording disclosures, or other use cases, as seen for example in FIG. 13). A user can have a custom use case and/or need to construct a specialized language operator-upon receiving a user-made selection of a "Create custom" option, the EIP 120 can automatically start the creation and testing flow for a custom language operator. FIG. 14 includes, in the background portion of the screen, examples of custom operators with different types (e.g., "literal spot" operators, performing an exact phrase match for given phrases, etc.).

Figure 15:
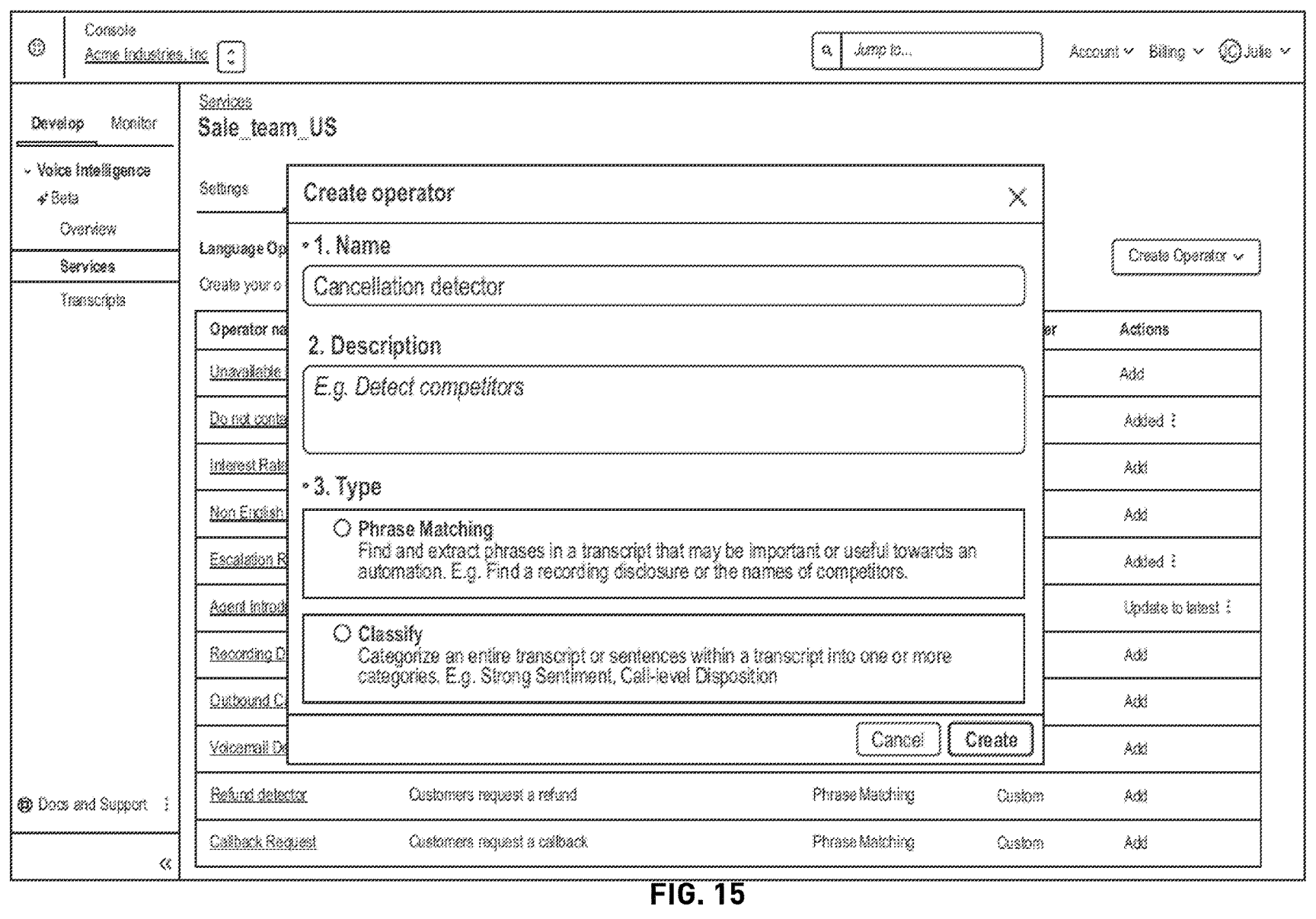

FIG. 15 is an illustration of a view of a UI to an EIP 120, according to some embodiments. In some embodiments, upon receiving a selection from a user (e.g., upon the user pressing or selecting a "Create Operator" element or similar), the EIP 120 displays one or more interactive UI elements enabled to solicit and receive user information to be used in the automatic creation of a language operators. For example, a UI can be enabled to accept a user-provided operator name (e.g., "Cancellation detector"), a description, an operator type (e.g., a phrase matching operator, a communication or communication portion classifying operator), a prompt to finalize the operator creation, a prompt to cancel the operator creation, or other inputs.

The top of the UI screen example prompts the user to provide a name and description for the target operator. The UI allows selecting the type of operator such as "Phrase Matching" (e.g., to find key phrases) or "Classify" (e.g., to categorize transcripts). The UI includes user-selectable buttons enabled to either create the operator using the provided details or cancel the creation. The bottom of the UI screen includes custom operator examples, such as "Refund detector" or "Callback request" detector.

Figure 16:
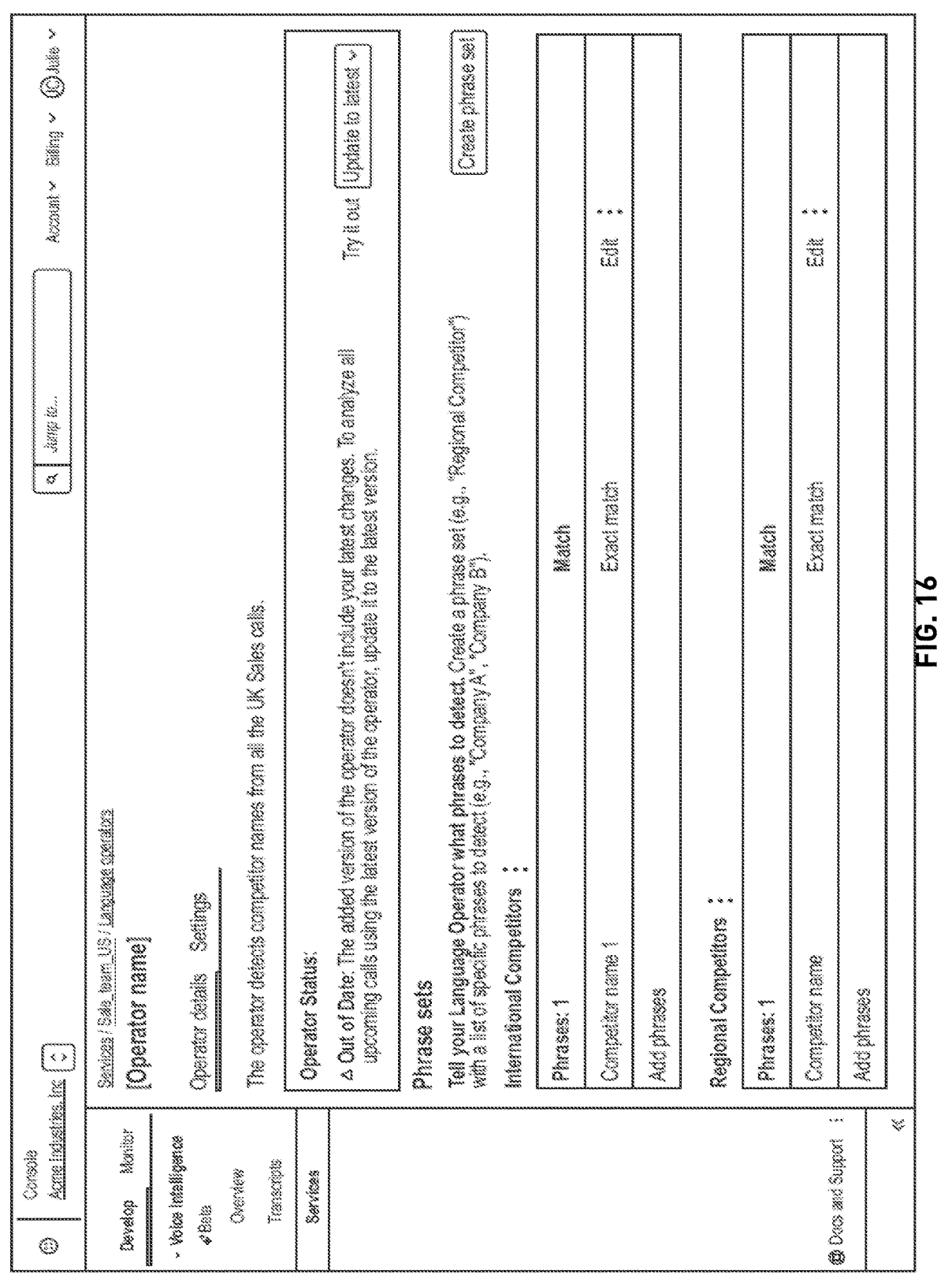

FIG. 16 is an illustration of a view of a UI to an EIP 120, according to some embodiments. Upon receiving a selection from a user (e.g., upon the user pressing or selecting an "Operator details" UI element), the EIP 120 displays information about configuring one or more language operators together with interactive UI elements enabling a user to finalize the configuration. At the top of the screen, the UI displays the name of an example language operator (e.g., an operator to detect competitor names from sales calls). A status indicator shows if the currently configured operator version is out of date. An interactive "Try it out" button allows the user to test the operator on recent transcripts.

The user can configure one or more "Phrase matching"-type operators (see also FIG. 15 for examples). In some embodiments, a "Phrase matching" operator automatically detects one or more phrases indicative of a core concept in a target communication. The "Phrase sets" section allows the user to specify example competitor name phrases that the operator should detect. The user can create separate phrase sets for different categories like "International Competitors" and "Regional Competitors" (e.g., each category can have an associated phrase matching operator or sub-operator, customized to the specific category). A phrase matching operator can have an "exact match' mode or a fuzzy match mode. Within each phrase set, the user enters sample competitor name phrases and chooses the type of text matching-either exact match or fuzzy match (see, e.g., FIG. 17). "Exact match" corresponds to the operator automatically identifying occurrences of exact prespecified phrases. In some embodiments, a fuzzy or approximate match corresponds to the operator identifying partial or approximate matches involving prespecified phrases. In some embodiments, the language operator can be implemented using a ML model trained to identify occurrences of the target concept (e.g., an international competitor, a regional competitor), where the prespecified phrases are used as part of training and testing the ML model, while the identified concept occurrences use partially or completely different communication words or communication phrases.

Interactive elements like "Add phrases" allow appending more phrases to each set. The bottom of the screen includes action buttons like "Add to service" to deploy the one or more configured operators, or "Update to latest" to ensure the current versions of the one or more operators are used for analysis.

Figure 17:
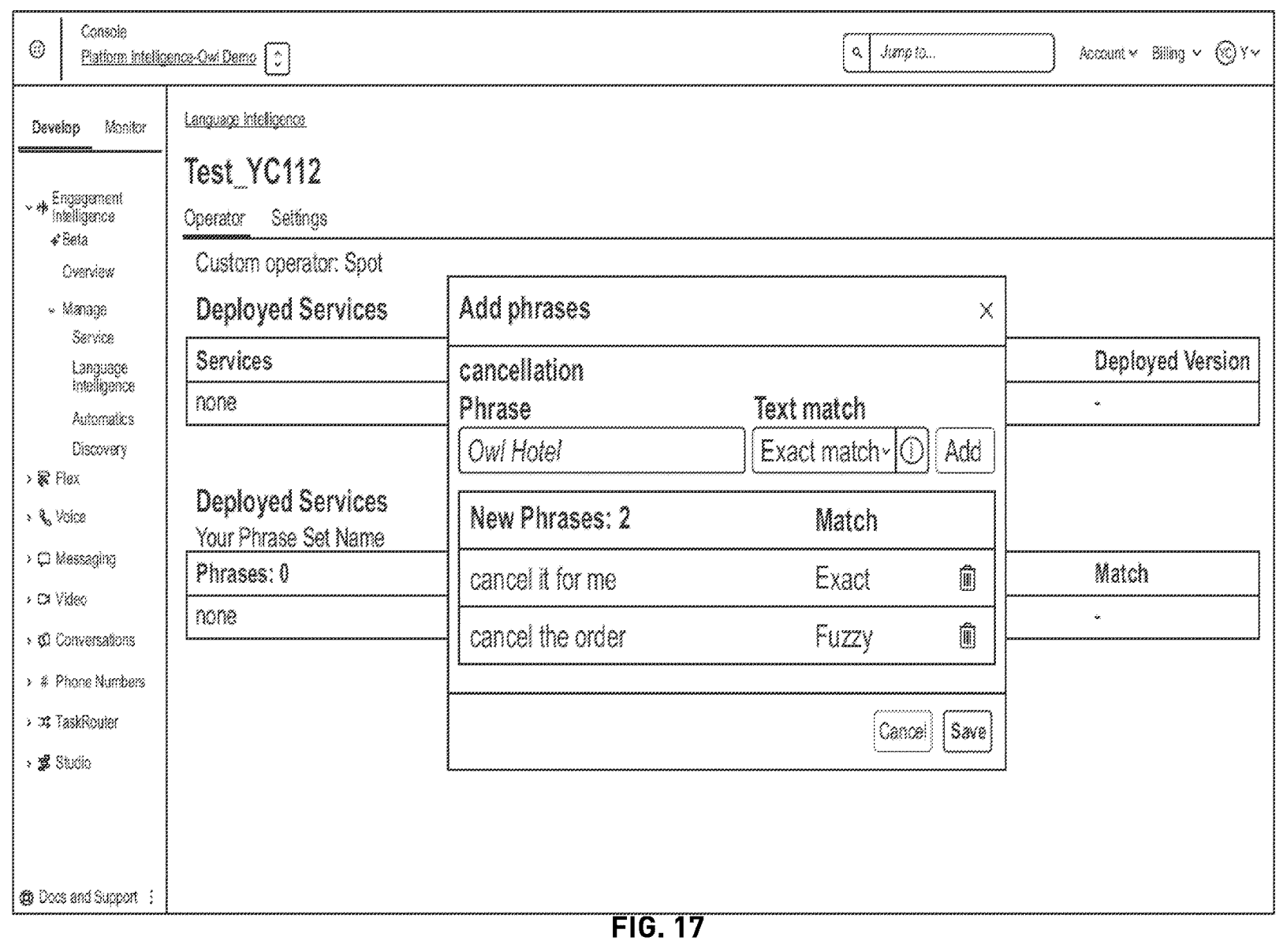

FIG. 17 is an illustration of a view of a UI to an EIP 120. In some embodiments, upon receiving a selection from a user (e.g., upon the user pressing or selecting a "Create Operator" element or similar), the EIP 120 displays one or more interactive UI elements enabled to solicit and receive user information to be used in the automatic creation of a language operator.

For example, in the case of a phrase matching language operator, upon receiving a user selection of an "Add phrases" UI element, the EIP 120 elicits and accepts text input from a user corresponding to phrases to be included in a phrase set associated with the language operator. In some embodiments, the EIP 120 also solicits a choice of phrase match type (e.g., exact, fuzzy, etc.). Each phrase can have an associated phrase match type. The phrase match type can be common across the phrase set. The user can provide phrases, or types of phrase matches, using text input, and/or using one or more selections of a menu or listing of candidate phrases (not shown).

The EIP 120 saves user provided configuration options for the target language operator for use in the automatic creation and testing of the language operator.

Figure 18:
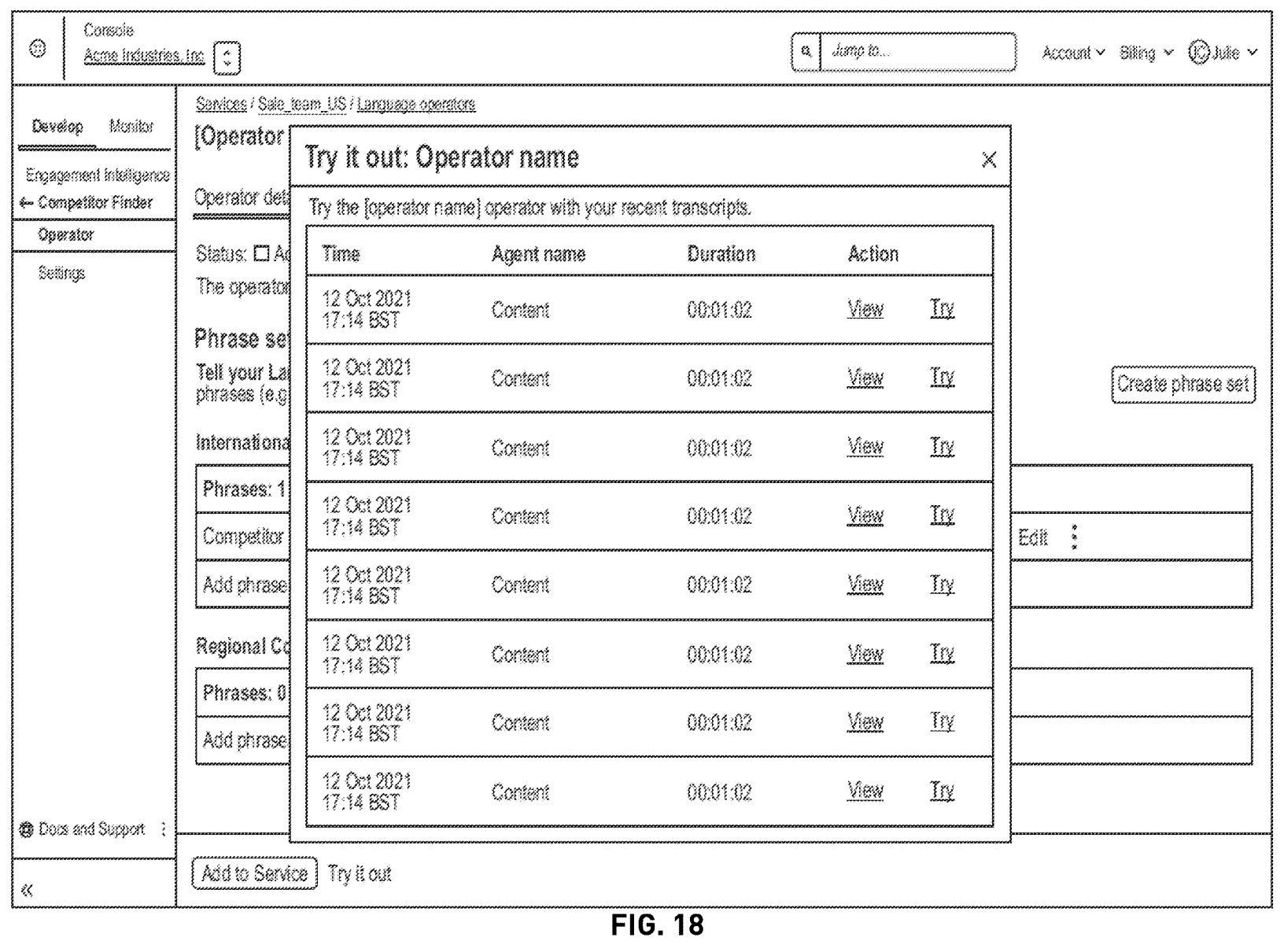

FIG. 18 is an illustration of a view of a UI to an EIP 120, according to some embodiments. In some embodiments, upon receiving a selection from a user of a "Try it out" or "View" (or similar) UI element in the context of language operator, the EIP 120 presents a follow-up UI screen. The presented UI screen displays recent communications, and allows the user to check the results of applying the respective language operator to one or more recent communications.

Figure 19:
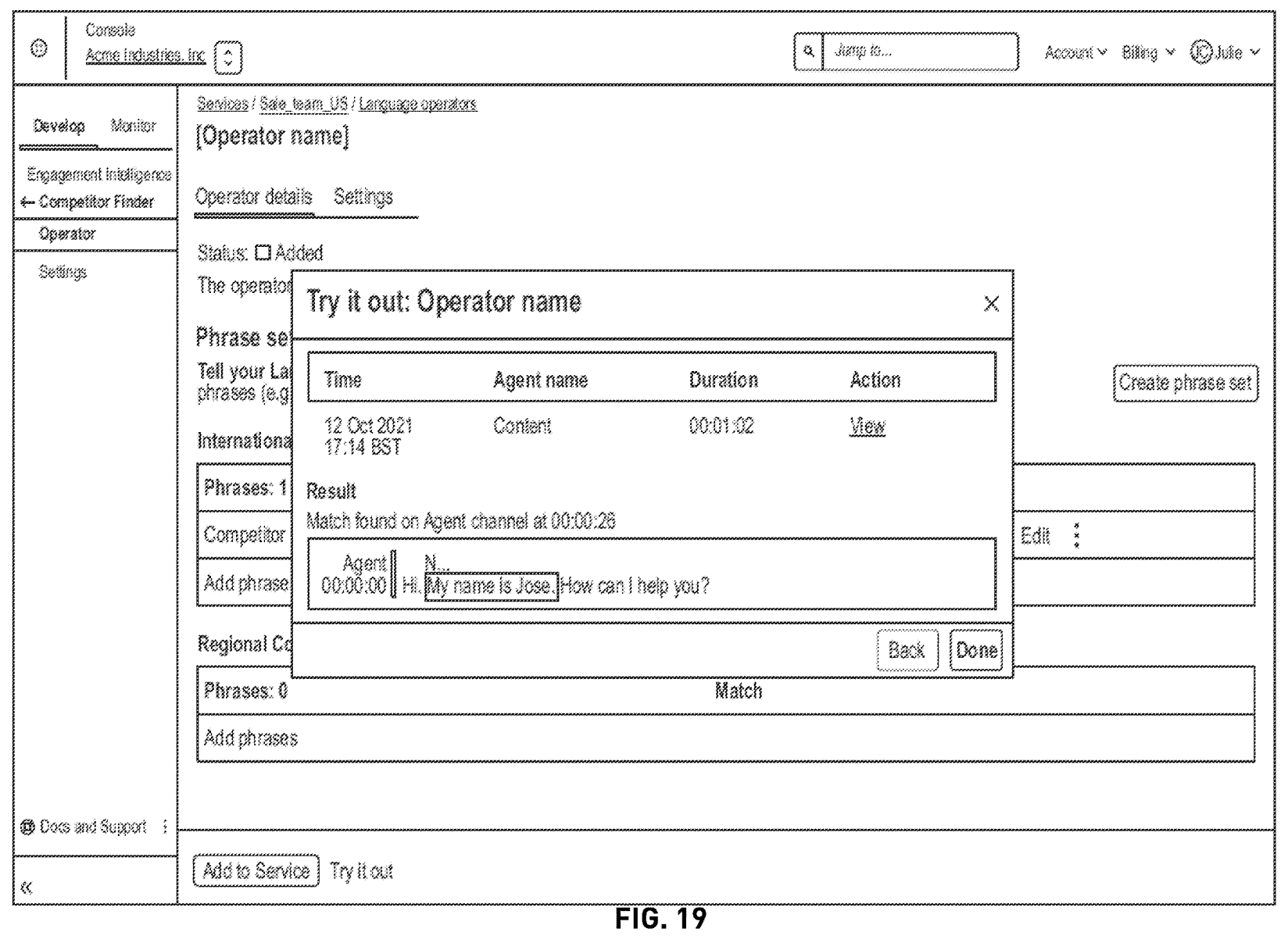

FIG. 19 is an illustration of a view of a UI to an EIP 120. In some embodiments, upon receiving a selection of a UI element (e.g., "Try it out") in the context of the language operator, the EIP 120 presents a follow-up UI screen. The follow-up UI screen displays an occurrence of a target concept and/or category or class corresponding to the definition of the language operator. For example, FIG. 19 shows a UI element comprising highlighted strings in a transcript corresponding to a set of words indicative of an agent introducing themselves by their name (e.g., corresponding to applying an "Agent Name" language operator to the communication). In some embodiments, the highlighted portions are interactive UI elements.

Figure 20:
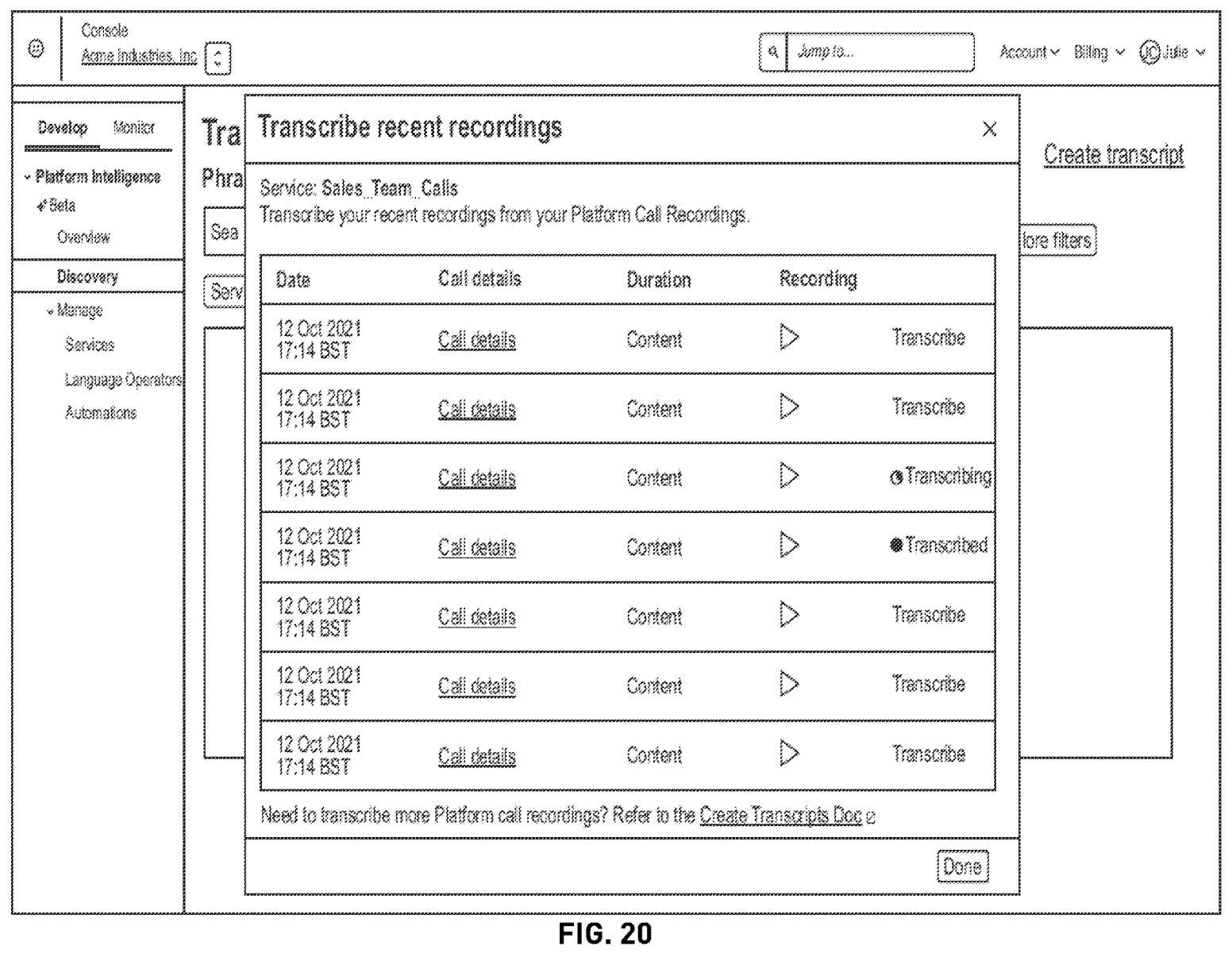

FIG. 20 is an illustration of a view of a UI to a EIP 120. In some embodiments, the EIP 120 displays a screen for each communication channel (e.g., a service such as "Sales_Team_Calls"), the screen displaying information about specific communications and interactive UI elements. For example, upon detecting a user's selection of a "Transcribe" element (or similar), the EIP 120 calls a call transcription service that generates a call-specific transcript and informs the user of the transcription state (in-progress, finished, etc.). Transcripts are then available for further analysis (e.g., language operators for text data can be automatically applied).

Figure 21:
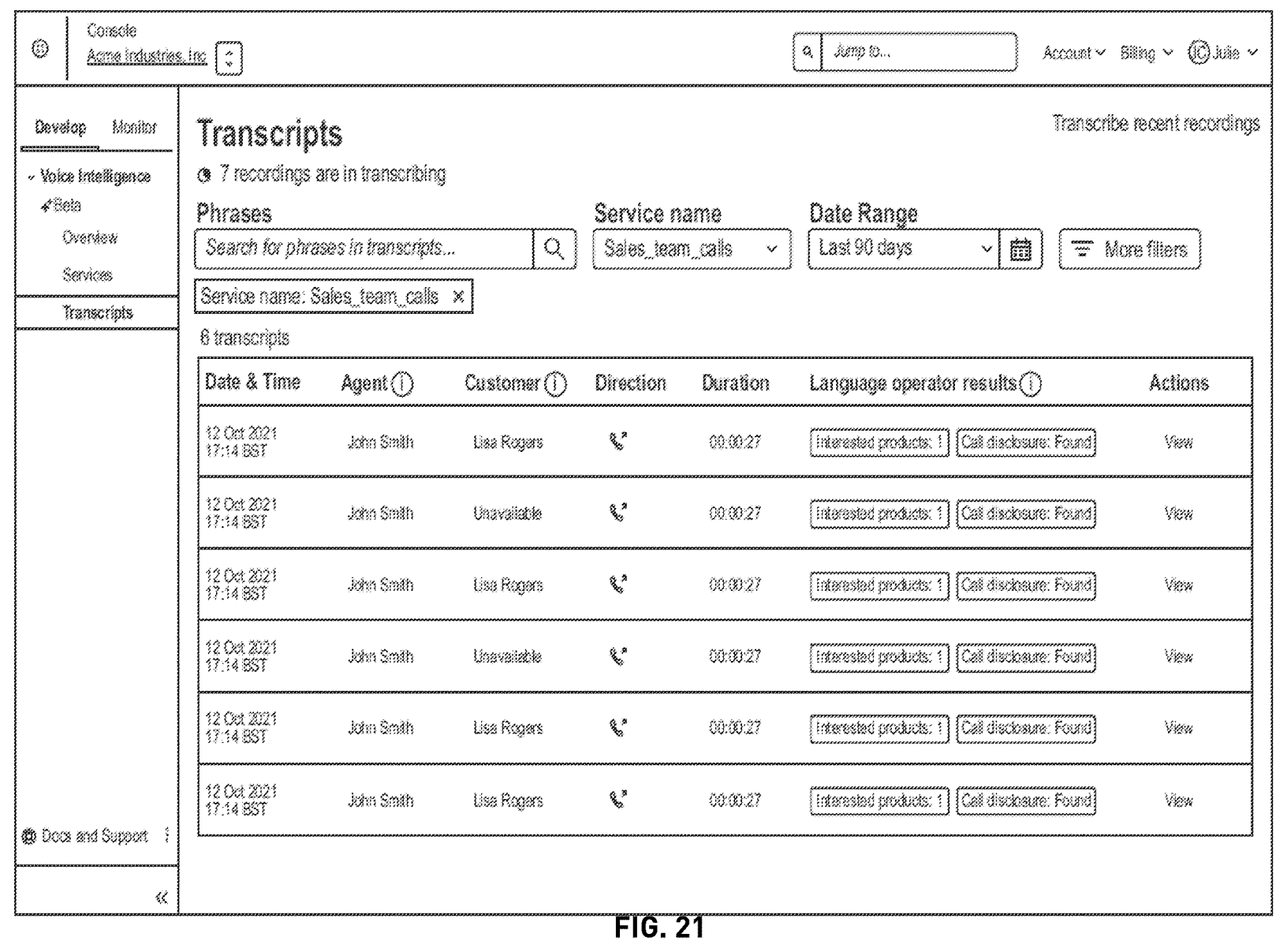

FIG. 21 is an illustration of a view of a UI to an EIP 120. In some embodiments, the EIP 120 displays a screen for each communication channel (e.g., a service such as "Sales_Team_Calls"), the screen displaying information about specific communications and interactive UI elements. For example, the screen can include a result summary for one or more language operators enabled for the specific service (e.g., "Interested products," "Call disclosure," etc.). The summary can include a count of the number of conceptual matches and/or classified portions matching the definition of a target operator. The summary can include categorical indicators in addition to numerical counts (e.g., marking that a call disclosure was found or not in a particular communication). Interactive UI elements can include elements (e.g., "view") that when selected, are enabled to trigger follow-up screens displaying specific language operator results in the context of the communication (as seen, for example, in FIG. 20). Interactive UI elements can also include search boxes—for example, EIP 120 can enable the service data to be searched using user-provided text input and/or audio or image data. Search can also be implemented as faceted search, with the UI including elements corresponding to facets and/or filters which can be selected by the user. Example filters include a date range filter or selecting a different service for inspection (additional embodiments can be seen at least in FIG. 22).

Figure 22:
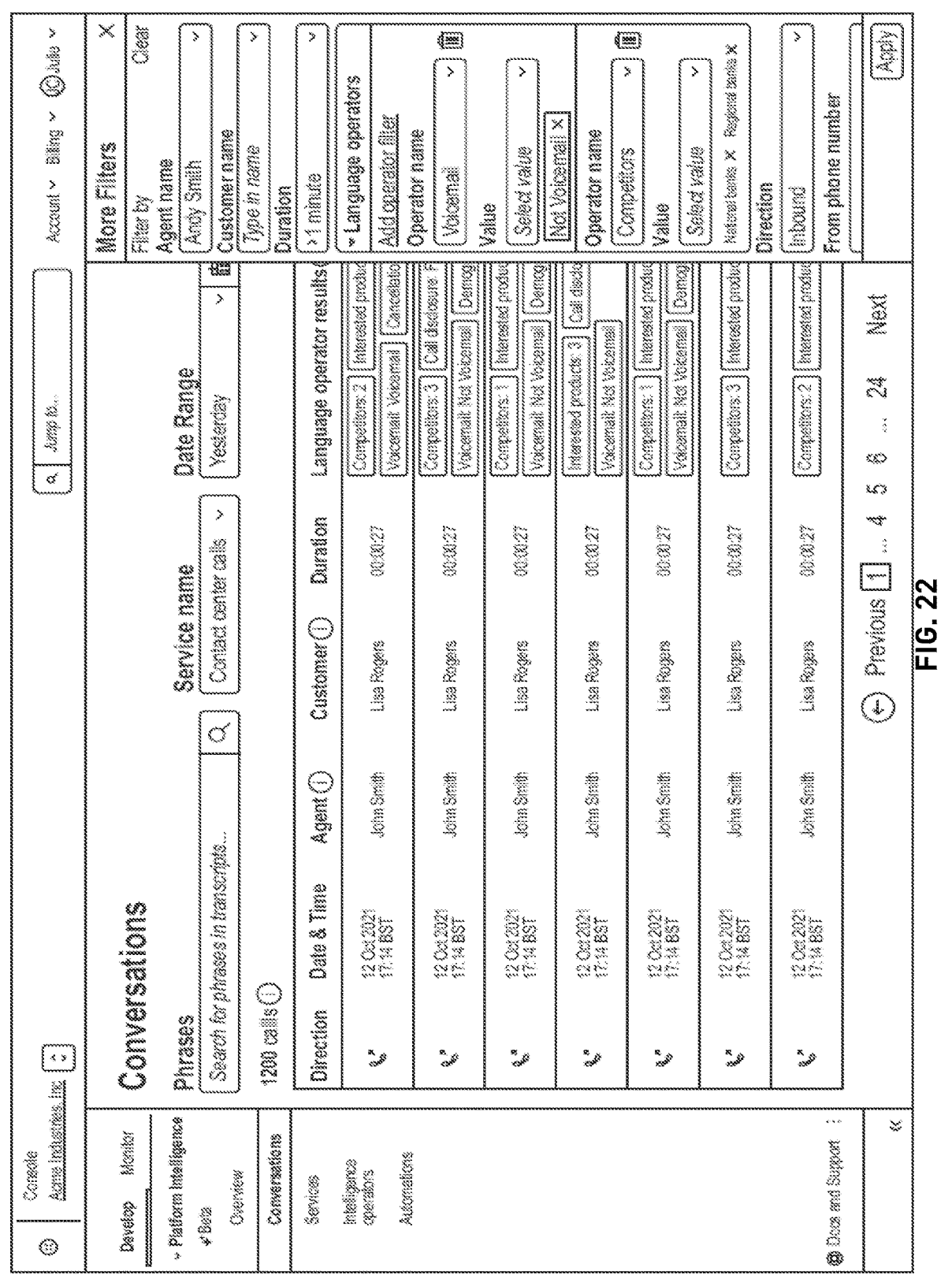

FIG. 22 is an illustration of a view of a UI to a EIP 120. In some embodiments, the EIP 120 displays a screen including interactive UI elements such as search boxes—for example, EIP 120 can enable the service data to be searched using user-provided text input and/or audio or image data. Search can also be implemented as faceted search, with the UI including elements corresponding to facets and/or filters which can be selected by the user. Filters can include default filters (e.g., "customer name," "duration," etc.) as well as a customizable filter display based on available language operators. An operator-based filter can be configured via the UI, with a user being able to choose a specific operator and specific values corresponding to the types and/or results of applying the operator to target communications.

FIG. 23 is an illustration of a view of a UI to a EIP 120. In some embodiments, the EIP 120 displays a screen for each communication channel (e.g., a service such as "Sales_Team_Calls"), the screen displaying information about specific communications and interactive UI elements. For example, the screen can include a result summary for one or more language operators enabled for the specific service (e.g., "Sentiment Analysis," "Call disclosure," "Callback request" etc.).

Communications can include calls (e.g., with associated automatically generated transcripts), e-mail communications, text messages, or other types of communications. The UI can include various (optionally interactive) analytics elements associated with types of communications and specific language operators.

Figure 24:
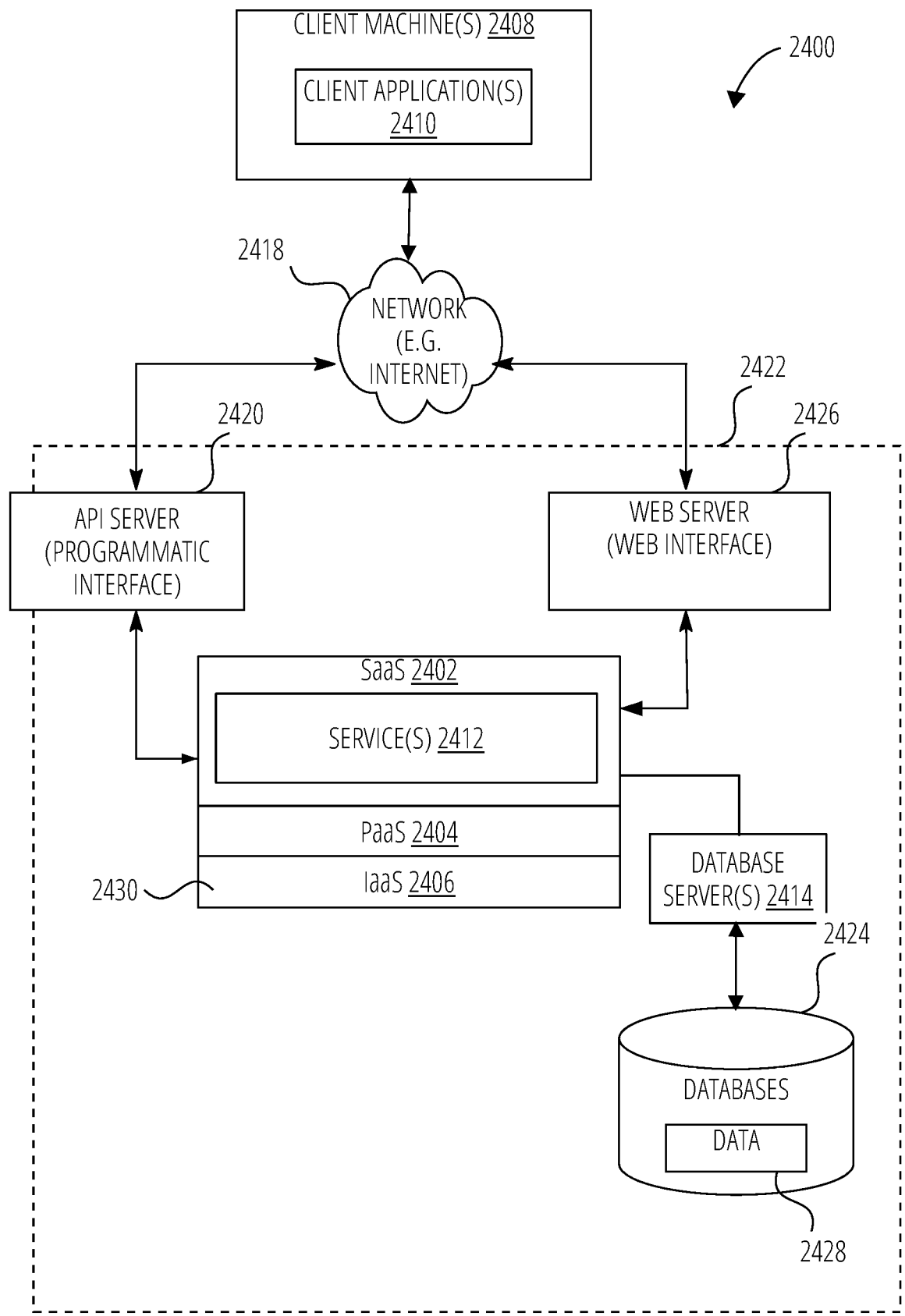
FIG. 24 is a network diagram illustrating a system within which various example embodiments may be deployed.

FIG. 24 is a network diagram depicting a system 2400 within which various example embodiments may be deployed (such as the EIP 120). A networked system 2422 in the example form of a cloud computing service, such as Microsoft Azure or other cloud service, provides server-side functionality, via a network (e.g., the Internet or Wide Area Network (WAN)) to one or more endpoints (e.g., client machine(s) 2408). FIG. 24 illustrates client application(s) 2410 on the client machine(s) 2408. Examples of client application(s) 2410 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications, file sharing applications, and contact center applications. Each of the client application(s) 2410 may include a software application module (e.g., a plug-in, add-in, or macro) that adds a specific service or feature to the application.

An API server 2420 and a web server 2426 are coupled to, and provide programmatic and web interfaces respectively to, one or more software services, which may be hosted on a software-as-a-service (SaaS) layer or platform 2402. The SaaS platform may be part of a service-oriented architecture, being stacked upon a platform-as-a-service (PaaS) layer 2404 which, may be, in turn, stacked upon a infrastructure-as-a-service (IaaS) layer 2406 (e.g., in accordance with standards defined by the National Institute of Standards and Technology (NIST)).

While the applications (e.g., service(s)) 2412 are shown in FIG. 24 to form part of the networked system 2422, in alternative embodiments, they may form part of a service that is separate and distinct from the networked system 2422.

Further, while the system 2400 shown in FIG. 24 employs a cloud-based architecture, various embodiments are, of course, not limited to such an architecture, and could equally well find application in a client-server, distributed, or peer-to-peer system, for example. The various server applications 2412 could also be implemented as standalone software programs. Additionally, although FIG. 24 depicts machines 2408 as being coupled to a single networked system 2422, it will be readily apparent to one skilled in the art that client machine(s) 2408, as well as client applications 2410, may be coupled to multiple networked systems, such as payment applications associated with multiple payment processors or acquiring banks (e.g., PayPal, Visa, MasterCard, and American Express).

Web applications executing on the client machine(s) 2408 may access the various applications 2412 via the web interface supported by the web server 2426. Similarly, native applications executing on the client machine(s) 2408 may access the various services and functions provided by the applications 2412 via the programmatic interface provided by the API server (programmatic interface) 2420. For example, the third-party applications may, utilizing information retrieved from the networked system 2422, support one or more features or functions on a website hosted by the third party. The third-party website may, for example, provide one or more promotional, marketplace or payment functions that are integrated into or supported by relevant applications of the networked system 2422.

The server applications 2412 may be hosted on dedicated or shared server machines (not shown) that are communicatively coupled to enable communications between server machines. The server applications 2412 themselves are communicatively coupled (e.g., via appropriate interfaces) to each other and to various data sources, so as to allow information to be passed between the server applications 2412 and so as to allow the server applications 2412 to share and access common data. The server applications 2412 may furthermore access one or more databases 2424 via the database servers 2414. In example embodiments, various data items are stored in the databases 2424, such as the system's data items 2428. In example embodiments, the system's data items may be any of the data items described herein.

Navigation of the networked system 2422 may be facilitated by one or more navigation applications. For example, a search application (as an example of a navigation application) may enable keyword searches of data items included in the one or more databases 2424 associated with the networked system 2422. A client application may allow users to access the system's data 2428 (e.g., via one or more client applications). Various other navigation applications may be provided to supplement the search and browsing applications.

Figure 25:
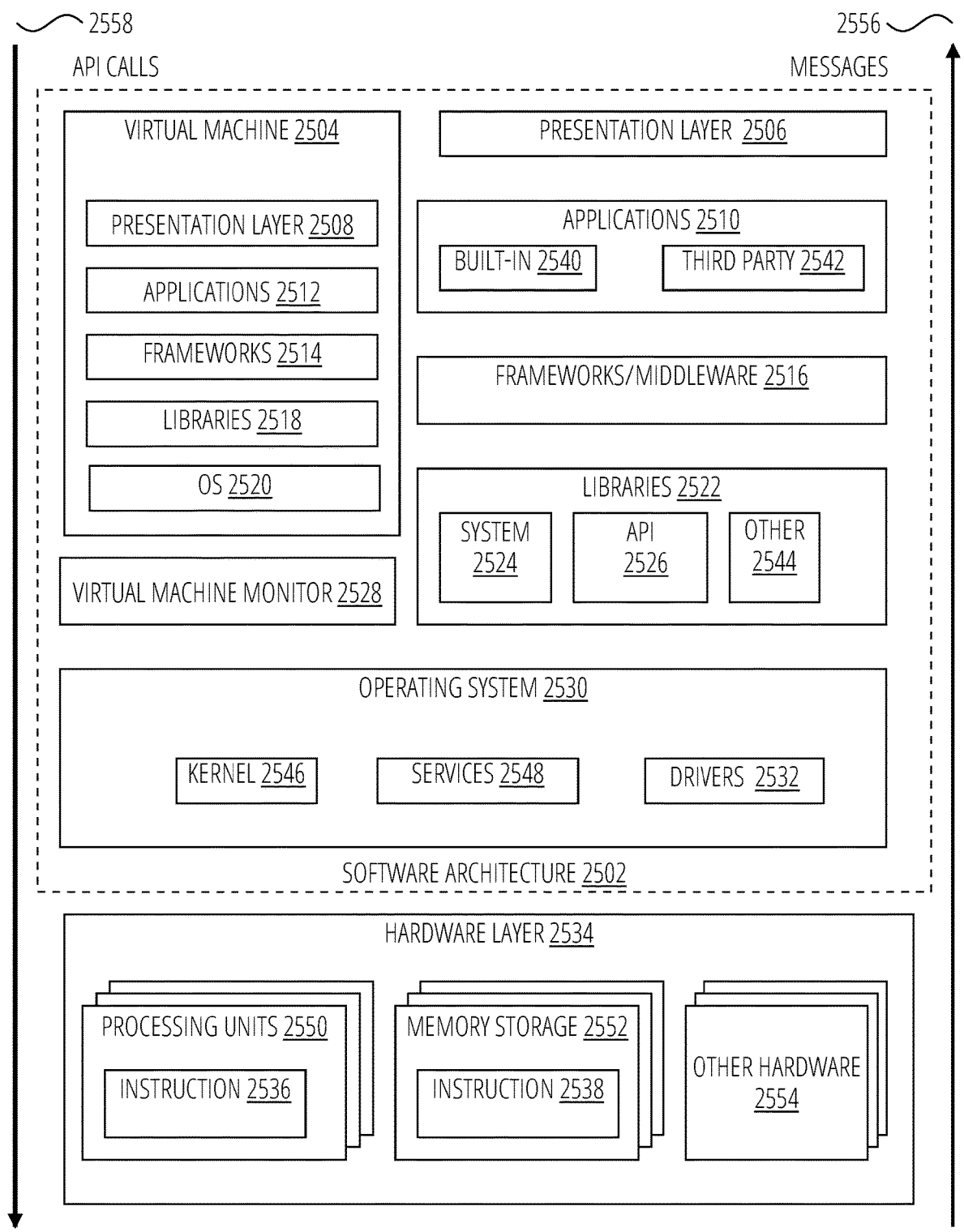
FIG. 25 is a block diagram illustrating an example of a software architecture that may be installed on a machine, according to some embodiments.

FIG. 25 is a block diagram illustrating an example of a software architecture 2502 that may be installed on a machine, according to some example embodiments. FIG. 25 is merely a non-limiting example of software architecture, and it will be appreciated that many other architectures may be implemented to facilitate the functionality described herein. The software architecture 2502 may be executing on hardware such as a machine 2600 of FIG. 26 that includes, among other things, processors 2604, memory/storage 2606, and input/output (I/O) components 1018. A representative hardware layer 2534 is illustrated and can represent, for example, the machine 2600 of FIG. 26. The representative hardware layer 2534 comprises one or more processing units 2550 having associated executable instructions 2536. The executable instructions 2536 represent the executable instructions of the software architecture 2502. The hardware layer 2534 also includes memory or storage 2552, which also have the executable instructions 2538. The hardware layer 2534 may also comprise other hardware 2554, which represents any other hardware of the hardware layer 2534, such as the other hardware illustrated as part of the machine 2600.

In the example architecture of FIG. 25, the software architecture 2502 may be conceptualized as a stack of layers, where each layer provides particular functionality. For example, the software architecture 2502 may include layers such as an operating system 2530, libraries 2518, frameworks/middleware 2516, applications 2510, and a presentation layer 2508. Operationally, the applications 2510 or other components within the layers may invoke API calls 2558 through the software stack and receive a response, returned values, and so forth (illustrated as messages 2556) in response to the API calls 2558. The layers illustrated are representative in nature, and not all software architectures have all layers. For example, some mobile or special-purpose operating systems may not provide a frameworks/middleware 2516 layer, while others may provide such a layer. Other software architectures may include additional or different layers.

The operating system 2530 may manage hardware resources and provide common services. The operating system 2530 may include, for example, a kernel 2546, services 2548, and drivers 2532. The kernel 2546 may act as an abstraction layer between the hardware and the other software layers. For example, the kernel 2546 may be responsible for memory management, processor management (e.g., scheduling), component management, networking, security settings, and so on. The services 2548 may provide other common services for the other software layers. The drivers 2532 may be responsible for controlling or interfacing with the underlying hardware. For instance, the drivers 2532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2518 may provide a common infrastructure that may be utilized by the applications 2510 and/or other components and/or layers. The libraries 2518 typically provide functionality that allows other software modules to perform tasks in an easier fashion than by interfacing directly with the underlying operating system 2530 functionality (e.g., kernel 2546, services 2548, or drivers 2532). The libraries 2518 may include system libraries 2518 (e.g., C standard library) that may provide functions such as memory allocation functions, string manipulation functions, mathematic functions, and the like. In addition, the libraries 2518 may include API libraries 2526 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2518 may also include a wide variety of other libraries 2522 to provide many other APIs to the applications 2520 and other software components/modules.

The frameworks 2514 (also sometimes referred to as middleware) may provide a higher-level common infrastructure that may be utilized by the applications 2510 or other software components/modules. For example, the frameworks 2514 may provide various graphical UI functions, high-level resource management, high-level location services, and so forth. The frameworks 2514 may provide a broad spectrum of other APIs that may be utilized by the applications 2510 and/or other software components/modules, some of which may be specific to a particular operating system or platform.

The applications 2510 include built-in applications and/or third-party applications 2542. Examples of representative built-in applications 2540 may include, but are not limited to, a home application, a contacts application, a browser application, a book reader application, a location application, a media application, a messaging application, or a game application.

The third-party applications 2542 may include any of the built-in applications 2540, as well as a broad assortment of other applications. In a specific example, the third-party applications 2542 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 2542 may invoke the API calls 2558 provided by the mobile operating system such as the operating system 2530 to facilitate functionality described herein.

The applications 2510 may utilize built-in operating system functions, libraries (e.g., system libraries 2524, API libraries 2526, and other libraries 2544), or frameworks/middleware 2516 to create UIs to interact with users of the system. Alternatively, or additionally, in some systems, interactions with a user may occur through a presentation layer, such as the presentation layer 2508. In these systems, the application/module "logic" can be separated from the aspects of the application/module that interact with the user.

Some software architectures utilize virtual machines. In the example of FIG. 25, this is illustrated by a virtual machine 2504. The virtual machine 2504 creates a software environment where applications/modules can execute as if they were executing on a hardware machine. The virtual machine 2504 is hosted by a host operating system (e.g., the operating system 2530) and typically, although not always, has a virtual machine monitor 2528, which manages the operation of the virtual machine 2504 as well as the interface with the host operating system (e.g., the operating system 2530). A software architecture executes within the virtual machine 2504, such as an operating system 2530, libraries 2518, frameworks/middleware 2516, applications 2512, or a presentation layer 2508. These layers of software architecture executing within the virtual machine 2504 can be the same as corresponding layers previously described or may be different.

Figure 26:
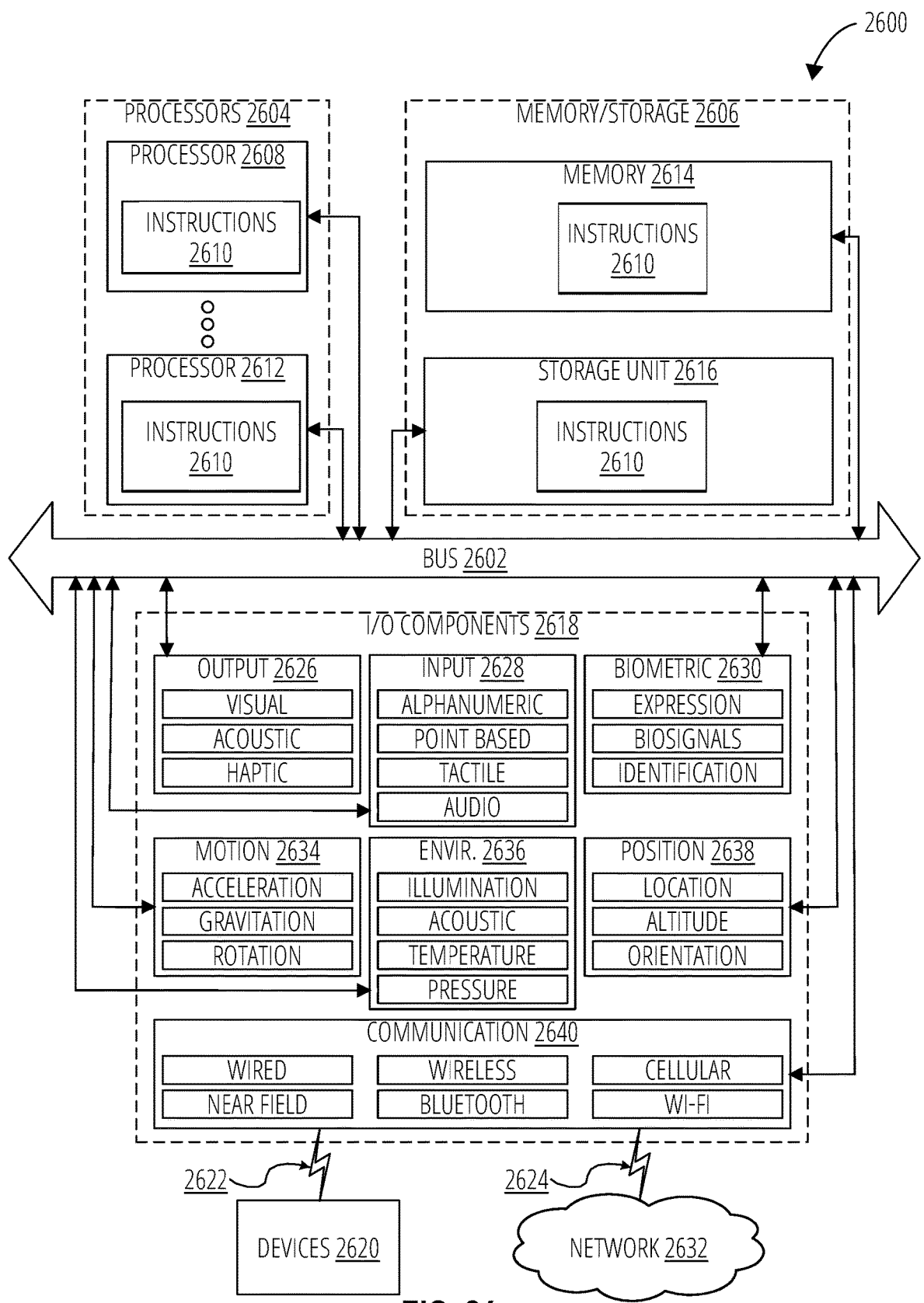
FIG. 26 is a block diagram illustrating components of a machine, according to some example embodiments, able to read instructions from a machine-readable medium (e.g., a machine-readable storage medium) and perform any one or more of the methodologies discussed herein.

FIG. 26 is a block diagram illustrating components of a machine 2600, according to some example embodiments, able to read instructions from a machine-readable medium (e.g., a machine-readable storage medium) and perform any one or more of the methodologies discussed herein. Specifically, FIG. 26 shows a diagrammatic representation of the machine 2600 in the example form of a computer system, within which instructions 2610 (e.g., software, a program, an application, an applet, an app, or other executable code) for causing the machine 2600 to perform any one or more of the methodologies discussed herein may be executed. As such, the instructions 2610 may be used to implement modules or components described herein. The instructions 2610 transform the general, non-programmed machine 2600 into a particular machine 2600 to carry out the described and illustrated functions in the manner described. In alternative embodiments, the machine 2600 operates as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 2610, sequentially or otherwise, that specify actions to be taken by machine 2600. Further, while only a single machine 2600 is illustrated, the term "machine" shall also be taken to include a collection of machines that individually or jointly execute the instructions 2610 to perform any one or more of the methodologies discussed herein.

The machine 2600 may include processors 2604, memory memory/storage 2606, and I/O components 2618, which may be configured to communicate with each other such as via a bus 2602. The memory/storage 2606 may include a memory 2614, such as a main memory, or other memory storage, and a storage unit 2616, both accessible to the processors 2604 such as via the bus 2602. The storage unit 2616 and memory 2614 store the instructions 2610 embodying any one or more of the methodologies or functions described herein. The instructions 2610 may also reside, completely or partially, within the memory 2614 within the storage unit 2616, within at least one of the processors 2604 (e.g., within the processor's cache memory), or any suitable combination thereof, during execution thereof by the machine 2600. Accordingly, the memory 2614, the storage unit 2616, and the memory of processors 2604 are examples of machine-readable media.

The I/O components 2618 may include a wide variety of components to receive input, provide output, produce output, transmit information, exchange information, capture measurements, and so on. The specific I/O components 2618 that are included in a particular machine 2600 will depend on the type of machine. For example, portable machines such as mobile phones will likely include a touch input device or other such input mechanisms, while a headless server machine will likely not include such a touch input device. It will be appreciated that the I/O components 2618 may include many other components that are not shown in FIG. 11. The I/O components 2618 are grouped according to functionality merely for simplifying the following discussion and the grouping is in no way limiting. In various example embodiments, the I/O components 2618 may include output components 2626 and input components 2628. The output components 2626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2618 may include biometric components 2630, motion components 2634, environmental environment components 2636, or position components 2638 among a wide array of other components. For example, the biometric components 2630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2634 may include acceleration sensor components (e.g., accelerometer), gravitation sensor components, rotation sensor components (e.g., gyroscope), and so forth. The environment components 2636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2638 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2618 may include communication components 2640 operable to couple the machine 2600 to a network 2632 or devices 2620 via coupling 2622 and coupling 2624 respectively. For example, the communication components 2640 may include a network interface component or other suitable device to interface with the network 2632. In further examples, communication components 2640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2620 may be another machine or any of a wide variety of peripheral devices (e.g., a peripheral device coupled via a Universal Serial Bus (USB)).

Moreover, the communication components 2640 may detect identifiers or include components operable to detect identifiers. For example, the communication components 2640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2640, such as, location via Internet Protocol (IP) geo-location, location via Wi-Fi® signal triangulation, location via detecting a NFC beacon signal that may indicate a particular location, and so forth.

Figure 27:
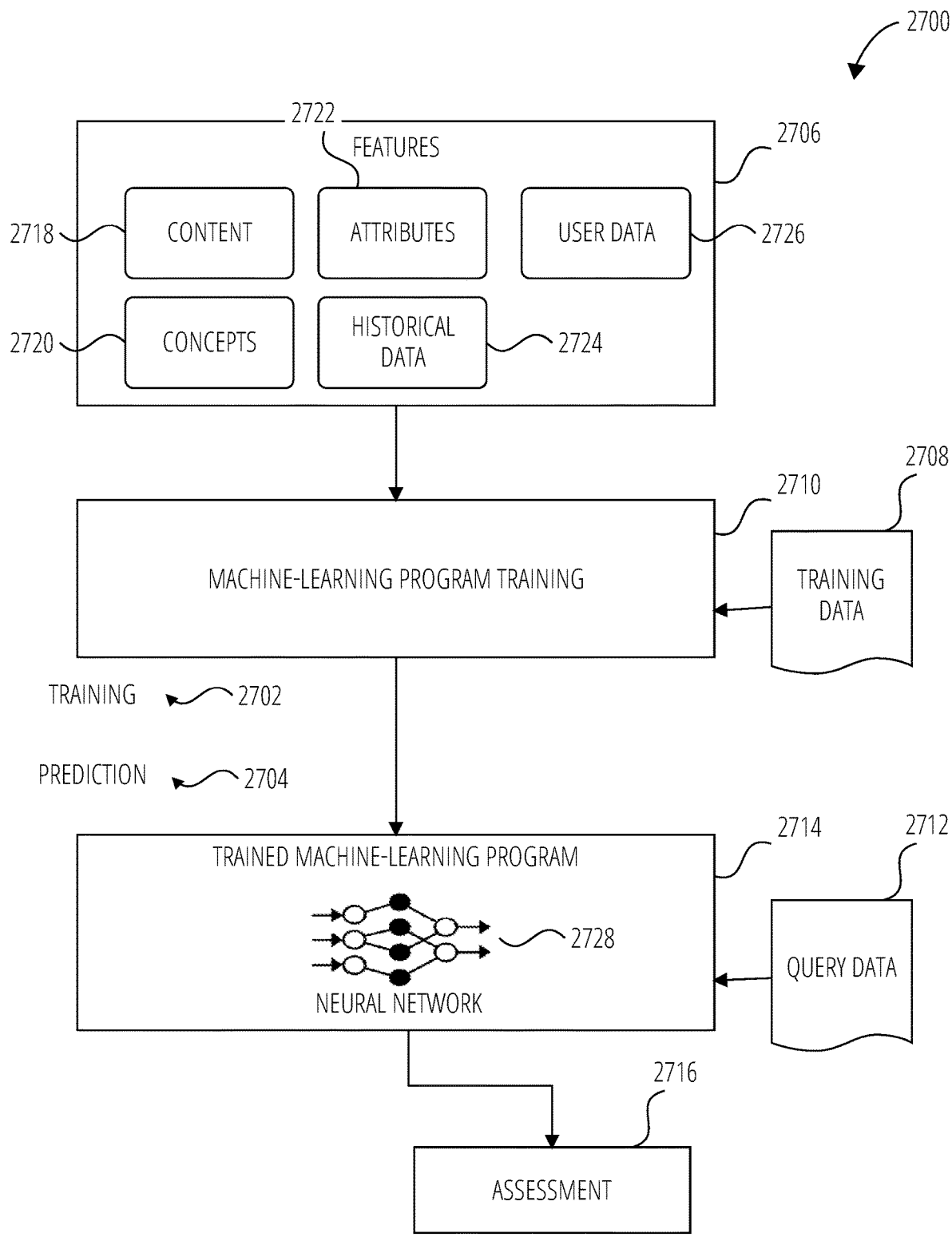
FIG. 27 is a block diagram showing a machine-learning program, according to some embodiments.

FIG. 27 is a block diagram showing a machine-learning program 2700 according to some examples. The machine-learning programs 2700, also referred to as machine-learning algorithms or tools, can be used by the EIP 120 described herein, for instance to implement and/or improve language operators.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 2708 in order to make data-driven predictions or decisions expressed as outputs or assessments (e.g., assessment 2716). Although examples are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), Gradient Boosted Decision Trees (GBDT), neural networks (NN), matrix factorization, and Support Vector Machines (SVM) tools may be used. In some example embodiments, one or more ML paradigms may be used: binary or n-ary classification, semi-supervised learning, etc. In some embodiments, time-to-event (TTE) data will be used during model training. In some example embodiments, a hierarchy or combination of models (e.g., stacking, bagging) may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 2700 supports two types of phases, namely a training phases 2702 and prediction phases 2704. In training phases 2702, supervised learning, unsupervised or reinforcement learning may be used. For example, the machine-learning program 2700 (1) receives features 2706 (e.g., as structured or labeled data in supervised learning) and/or (2) identifies features 2706 (e.g., unstructured or unlabeled data for unsupervised learning) in training data 2708. In prediction phases 2704, the machine-learning program 2700 uses the features 2706 for analyzing query data 2712 to generate outcomes or predictions, as examples of an assessment 2716.

In the training phase 2702, feature engineering is used to identify features 2706 and may include identifying informative, discriminating, and independent features for the effective operation of the machine-learning program 2700 in pattern recognition, classification, and regression. In some example embodiments, the training data 2708 includes labeled data, which is known data for pre-identified features 2706 and one or more outcomes. Each of the features 2706 may be a variable or attribute, such as individual measurable property of a process, article, system, or phenomenon represented by a data set (e.g., the training data 2708). Features 2706 may also be of different types, such as numeric features, strings, and graphs, and may include one or more of content 2718, concepts 2720, attributes 2722, historical data 2724 and/or user data 2726, merely for example.

In training phases 2702, the machine-learning program 2700 uses the training data 2708 to find correlations among the features 2706 that affect a predicted outcome or assessment 2716.

With the training data 2708 and the identified features 2706, the machine-learning program 2700 is trained during the training phase 2702 at machine-learning program training 2710. The machine-learning program 2700 appraises values of the features 2706 as they correlate to the training data 2708. The result of the training is the trained machine-learning program 2714 (e.g., a trained or learned model).

Further, the training phases 2702 may involve machine learning, in which the training data 2708 is structured (e.g., labeled during preprocessing operations), and the trained machine-learning program 2714 implements a relatively simple neural network 2728 (or one of other machine learning models, as described herein) capable of performing, for example, classification and clustering operations. In other examples, the training phase 2702 may involve deep learning, in which the training data 2708 is unstructured, and the trained machine-learning program 2714 implements a deep neural network 2728 that is able to perform both feature extraction and classification/clustering operations.

A neural network 2728 generated during the training phase 2702, and implemented within the trained machine-learning program 2714, may include a hierarchical (e.g., layered) organization of neurons. For example, neurons (or nodes) may be arranged hierarchically into a number of layers, including an input layer, an output layer, and multiple hidden layers. The layers within the neural network 2728 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some example embodiments, the neural network 2728 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases 2704 the trained machine-learning program 2714 is used to perform an assessment. Query data 2712 is provided as an input to the trained machine-learning program 2714, and the trained machine-learning program 2714 generates the assessment 2716 as output, responsive to receipt of the query data 2712.

In example embodiments, machine-learning may be applied to set the threshold values and/or the scale (e.g., to optimize the matching of categories to the attributes of the users associated with the specific categories). For example, training data may include attributes and/or behaviors of employees (e.g., anonymously extracted from system data) and the machine-learned model may be configured to output optimized threshold values and/or scales for categorizing the users more accurately over time.

In example embodiments, one or more artificial intelligence agents, such as one or more machine-learned algorithms or models and/or a neural network of one or more machine-learned algorithms or models, may be trained iteratively (e.g., in a plurality of stages) using a plurality of sets of input data. For example, a first set of input data may be used to train one or more of the artificial agents. Then, the first set of input data may be transformed into a second set of input data for retraining the one or more artificial intelligence agents (e.g., to reduce false positives or otherwise improve accuracy with respect to one or more outputs). The continuously updated and retrained artificial intelligence agents may then be applied to subsequent novel input data to generate one or more of the outputs described herein.

Example Embodiments

Example embodiment 1 is a computer-implemented method comprising: receiving a definition of a language operator, the definition comprising one or more phrases indicative of a match to a concept associated with a communication; surfacing, in a UI, one or more results of applying the language operator to the communication, the surfacing of each result of the one or more results using an interactive UI element linked to one or more communication phrases, the interactive UI element highlighting a match between the concept and the one or more communication phrases; and training a machine learned (ML) model to improve an accuracy of the result based on one or more inputs received via the UI.

In Example embodiment 2, the subject matter of Example embodiment 1 includes, wherein surfacing the one or more results of applying the language operator to the communication further comprises: surfacing an identifier associated with the language operator; and surfacing an indicator associated with the one or more results of applying the language operator to the communication.

In Example embodiment 3, the subject matter of Example embodiment 2 includes, wherein the indicator is a count of the one or more results of applying the language operator to the communication.

In Example embodiment 4, the subject matter of Example embodiments 1-3 includes, wherein an input of the one or more inputs received via the UI corresponds to a user indicating a confirmation or a rejection of a result of the one or more results of applying the language operator to the communication.

In Example embodiment 5, the subject matter of Example embodiment 4 includes, wherein training the ML model to improve the accuracy of the result comprises: augmenting a training set for the ML model with a training example derived based on the input received via the UI, the ML model being enabled to implement the language operator, the training example including a context comprising the one or more communication phrases and a label being one of a positive label or a negative label, wherein: the label is the positive label if the input corresponds to the user indicating the confirmation of the result; and the label is the negative label if the input corresponds to the user indicating the rejection of the result; and training the ML model using the augmented training set.

In Example embodiment 6, the subject matter of Example embodiments 4-5 includes, assessing a quality of the input based on one or more characteristics of the user.

In Example embodiment 7, the subject matter of Example embodiments 1-6 includes, surfacing, in the UI, a plurality of language operators, wherein each language operator of the plurality of language operators is associated with an identifier, a set of results of applying the language operator to the communication, and an indicator associated with the set of results.

In Example embodiment 8, the subject matter of Example embodiments 7 includes, wherein the plurality of language operators comprise at least one of an extract operator, or a classify operator.

In Example embodiment 9, the subject matter of Example embodiments 7-8 includes, wherein the indicator associated with each language operator of the plurality of language operators is the number of elements in the set of results of applying the language operator to the communication.

In Example embodiment 10, the subject matter of Example embodiments 7-9 includes, surfacing a ranking of the plurality of language operators wherein a ranking position of each language operator of the plurality of language operators is determined based on the indicator associated with the language operator.

Example embodiment 11 is at least one machine-readable medium including instructions that, when executed by processing circuitry, cause the processing circuitry to perform operations to implement of any of Example embodiments 1-10.

Example embodiment 12 is an apparatus comprising means to implement of any of Example embodiments 1-10.

Example embodiment 13 is a system to implement of any of Example embodiments 1-10.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessorbased or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

While various operations in flowcharts are presented and described sequentially, one of ordinary skill will appreciate that some or all of the operations can be executed in a different order, be combined or omitted, or be executed in parallel.

It will be understood that changes and modifications may be made to the disclosed embodiments without departing from the scope of the present disclosure. These and other changes or modifications are intended to be included within the scope of the present disclosure.

What is claimed is:

1. A computer-implemented method comprising:
receiving a definition of a language operator, the definition comprising one or more phrases indicative of a match to a concept associated with a communication;
surfacing, in a UI, one or more results of applying the language operator to the communication, the surfacing of each result of the one or more results using an interactive UI element linked to one or more communication phrases, the interactive UI element highlighting a match between the concept and the one or more communication phrases, the surfacing of the one or more results further comprising:
surfacing an identifier associated with the language operator, and
surfacing an indicator corresponding to a count of the one or more results of applying the language operator to the communication; and
training a machine learned (ML) model to improve an accuracy of the one or more results based on one or more inputs received via the UI, an input of the one of more inputs corresponding to a user indicating a confirmation or a rejection of a result of the one or more results, a quality of the input being assessed based on one or more user characteristics, the one or more user characteristics comprising at least one of a plurality of expertise levels associated with language operators.

2. The method of claim 1, wherein training the ML model to improve the accuracy of the one or more results comprises:
augmenting a training set for the ML model with a training example derived based on the input received via the UI, the ML model being enabled to implement the language operator, the training example including a context comprising the one or more communication phrases and a label being one of a positive label or a negative label, wherein:
the label is the positive label if the input corresponds to the user indicating the confirmation of the result of applying the language operator to the communication; and
the label is the negative label if the input corresponds to the user indicating the rejection of the result of applying the language operator to the communication; and
training the ML model using the augmented training set.

3. The method of claim 1, further comprising surfacing, in the UI, a plurality of language operators, wherein each language operator of the plurality of language operators is associated with an identifier, a set of results of applying the language operator to the communication, and an indicator associated with the set of results.

4. The method of claim 3, wherein the plurality of language operators comprise at least one of an extract operator, or a classify operator.

5. The method of claim 3, wherein the indicator associated with each language operator of the plurality of language operators is a number of elements in the set of results of applying the language operator to the communication.

6. The method of claim 3, further comprising surfacing a ranking of the plurality of language operators wherein a ranking position of each language operator of the plurality of language operators is determined based on the indicator associated with the language operator.

7. A system comprising:
at least one processor; and
a memory storing instructions that, when executed by the at least one processor, configure the system to:
receive a definition of a language operator, the definition comprising one or more phrases indicative of a match to a concept associated with a communication;
surface, in a UI, one or more results of applying the language operator to the communication, the surfacing of each result of the one or more results using an interactive UI element linked to one or more communication phrases, the interactive UI element highlighting a match between the concept and the one or more communication phrases, the surfacing of the one or more results further comprising:
surfacing an identifier associated with the language operator, and
surfacing an indicator corresponding to a count of the one or more results of applying the language operator to the communication; and
train a ML model to improve an accuracy of the one or more results based on one or more inputs received via the UI, an input of the one of more inputs corresponding to a user indicating a confirmation or a rejection of a result of the one or more results, a quality of the input being assessed based on one or more user characteristics, the one or more user characteristics comprising at least one of a plurality of expertise levels associated with language operators.

8. The system of claim 7, wherein training the ML model to improve the accuracy of the result comprises:
augmenting a training set for the ML model with a training example derived based on the input received via the UI, the ML model being enabled to implement the language operator, the training example comprising a context comprising the one or more communication phrases and a label being one of a positive label or a negative label, wherein:
the label is the positive label if the input corresponds to the user indicating the confirmation of the result of applying the language operator to the communication; and
the label is the negative label if the input corresponds to the user indicating the rejection of the result of applying the language operator to the communication; and
training the ML model using the augmented training set.

9. The system of claim 7, wherein the instructions further configure the system to surface, in the UI, a plurality of language operators, wherein each language operator of the plurality of language operators is associated with an identifier, a set of results of applying the language operator to the communication, and an indicator associated with the set of results.

10. The system of claim 9, wherein the indicator associated with each language operator of the plurality of language operators is a number of elements in the set of results of applying the language operator to the communication.

11. The system of claim 9, wherein the plurality of language operators comprises at least one of an extract operator or a classify operator.

12. A non-transitory computer-readable storage medium, the computer-readable storage medium including instructions that when executed by at least one processor, cause the at least one processor to:
receive a definition of a language operator, the definition comprising one or more phrases indicative of a match to a concept associated with a communication;
surface, in a UI, one or more results of applying the language operator to the communication, the surfacing of each result of the one or more results using an interactive UI element linked to one or more communication phrases, the interactive UI element highlighting a match between the concept and the one or more communication phrases, the surfacing of the one or more results further comprising:
surfacing an identifier associated with the language operator, and
surfacing an indicator corresponding to a count of the one or more results of applying the language operator to the communication; and
train a ML model to improve an accuracy of the one or more results based on one or more inputs received via the UI, an input of the one of more inputs corresponding to a user indicating a confirmation or a rejection of a result of the one or more results, a quality of the input being assessed based on one or more user characteristics, the one or more user characteristics comprising at least one of a plurality of expertise levels associated with language operators.

* * * * *